(12) United States Patent
Sagasaki et al.

(10) Patent No.: US 10,007,247 B2
(45) Date of Patent: Jun. 26, 2018

(54) NUMERICAL CONTROL DEVICE WITH PLURALITY OF SPINDLES AND ASSOCIATED SYNCHRONOUS TAPPING

(71) Applicant: Mitsubishi Electric Corporation, Tokyo (JP)

(72) Inventors: Masakazu Sagasaki, Tokyo (JP); Koji Terada, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 433 days.

(21) Appl. No.: 14/787,809

(22) PCT Filed: Apr. 30, 2013

(86) PCT No.: PCT/JP2013/062636
§ 371 (c)(1),
(2) Date: Oct. 29, 2015

(87) PCT Pub. No.: WO2014/178115
PCT Pub. Date: Nov. 6, 2014

(65) Prior Publication Data
US 2016/0109872 A1    Apr. 21, 2016

(51) Int. Cl.
*G06F 19/00* (2018.01)
*G05B 19/18* (2006.01)
*B23Q 15/00* (2006.01)

(52) U.S. Cl.
CPC .......... *G05B 19/182* (2013.01); *B23Q 15/00* (2013.01); *G05B 19/18* (2013.01); *G05B 2219/50291* (2013.01)

(58) Field of Classification Search
CPC ........ G05B 2219/45216; G05B 19/182; G05B 2219/50008; G05B 19/18; G05B 2219/50291; B23Q 15/00
See application file for complete search history.

(56) References Cited

U.S. PATENT DOCUMENTS

| 1,574,631 A | 2/1926 | Mirfield |
| 3,891,910 A * | 6/1975 | Kumagai ............... G05B 19/21 |
| | | 318/572 |

(Continued)

FOREIGN PATENT DOCUMENTS

| CN | 2604265 Y | 2/2004 |
| CN | 201900274 U | 7/2011 |

(Continued)

OTHER PUBLICATIONS

Jedrzejewski, Jerzy, and Wojciech Kwasny. "Development of machine tools design and operational properties." The International Journal of Advanced Manufacturing Technology 93.1-4 (2017): 1051-1068.*

(Continued)

*Primary Examiner* — Michael D Masinick
(74) *Attorney, Agent, or Firm* — Sughrue Mion, PLLC; Richard C. Turner

(57) ABSTRACT

A numerical control device is the numerical control device that controls a machine tool including a plurality of spindles that each rotate a tool opposed to a workpiece around a tool axis relative to the workpiece and a feed shaft that performs a feed operation such that a plurality of the tools relatively move closer to a plurality of the workpieces, and the numerical control device includes an associated-synchronous-tapping unit that associates, according to an associated-synchronous-tapping command, rotation and feed of a spindle on an associated side among the spindles with rotation and feed of a spindle on a reference side among the spindles and simultaneously performs synchronous tapping with the tools.

10 Claims, 13 Drawing Sheets

(56) References Cited

U.S. PATENT DOCUMENTS

| | | | | |
|---|---|---|---|---|
| 3,895,424 | A | * | 7/1975 | Hautau ............. B23B 29/03471 29/38 C |
| 4,784,539 | A | * | 11/1988 | Lehmkuhl ......... B23B 29/03457 33/505 |
| 5,189,624 | A | * | 2/1993 | Barlow ................ G05B 19/182 700/169 |
| 5,787,560 | A | | 8/1998 | Schalles |
| 6,029,098 | A | * | 2/2000 | Serizawa ............ G05B 19/416 408/3 |
| 6,551,033 | B2 | * | 4/2003 | Kakino .................... B23G 1/16 408/3 |
| 6,971,294 | B1 | | 12/2005 | Shinohara et al. |
| 7,708,506 | B2 | * | 5/2010 | Johnson .................... B23G 1/46 408/238 |
| 8,550,755 | B2 | * | 10/2013 | Johnson ................ B23B 31/083 279/16 |
| 9,122,265 | B2 | * | 9/2015 | Terada .................... G05B 19/19 |
| 9,507,337 | B2 | * | 11/2016 | Terada ................. G05B 19/182 |
| 9,513,619 | B2 | * | 12/2016 | Nishiwaki ................ B23G 1/16 |
| 9,539,646 | B2 | * | 1/2017 | Johnson ................ B23B 31/083 |
| 9,886,020 | B2 | * | 2/2018 | Tezuka ................. G05B 19/182 |
| 2001/0015116 | A1 | * | 8/2001 | Kakino .................... B23G 1/16 82/1.11 |
| 2012/0007539 | A1 | | 1/2012 | Katou et al. |
| 2013/0336738 | A1 | | 12/2013 | Glimpel et al. |
| 2016/0109872 | A1 | * | 4/2016 | Sagasaki ............. G05B 19/182 700/169 |

FOREIGN PATENT DOCUMENTS

| | | |
|---|---|---|
| JP | 49-122496 U | 10/1974 |
| JP | 64-034608 A | 2/1989 |
| JP | 03-126104 A | 5/1991 |
| JP | 04-244350 A | 9/1992 |
| JP | 07-185901 A | 7/1995 |
| JP | 10-501758 A | 2/1998 |
| JP | 2000-305612 A | 11/2000 |
| JP | 2001-252825 A | 9/2001 |
| JP | 2002-326140 A | 11/2002 |
| JP | 2007185748 A | 7/2007 |
| JP | 2010-149207 A | 7/2010 |
| JP | 4677062 B2 | 4/2011 |
| WO | 2010/113204 A1 | 10/2010 |
| WO | 2012/080315 A1 | 6/2012 |

OTHER PUBLICATIONS

Communication dated Feb. 28, 2017 from the State Intellectual Property Office of the P.R.C. in counterpart application No. 201380076091.0.

Notice of Rejection issued in the corresponding Japanese Application No. 2013-553737 dated Apr. 30, 2014.

International Search Report of PCT/JP2013/062636 dated Jul. 23, 2013 [PCT/ISA/210].

Communication dated Feb. 17, 2016, from the Intellectual Property Office of Taiwan in counterpart application No. 102141217.

* cited by examiner

G180 Z2=50. S1=S2 F1=1.0 F2=0.5 S1000 T1

G180 Z1=55. Z2=50. S1=S2 F1=1.0 F2=0.5 S1000 T1

NUMERICAL CONTROL DEVICE WITH PLURALITY OF SPINDLES AND ASSOCIATED SYNCHRONOUS TAPPING

CROSS REFERENCE TO RELATED APPLICATIONS

This application is a National Stage of International Application No. PCT/JP2013/062636, filed Apr. 30, 2013, the contents of which are incorporated herein by reference in its entirety.

FIELD

The present invention relates to a numerical control device.

BACKGROUND

Patent Literature 1 mentions a multi-axis tapping device that includes five tapping assemblies, in which spindles driven to rotate by spindle motors are respectively provided, and a frame that supports the five tapping assemblies laterally in a row and is reciprocatingly driven by a feed motor, the spindle motors being individually rotated in synchronization with the feed motor to perform machining of tap holes in a workpiece using taps attached to the distal ends of the spindles. Consequently, according to Patent Literature 1, to change the disposition of the spindles according to the change of the portion of the workpiece being tapped, a through-hole formed in a frame member and a holding plate only have to be changed to those corresponding to the portion of the workpiece being machined to change the disposition of the tapping assemblies that bear the spindles. Therefore, the number of components necessary for the change is reduced.

CITATION LIST

Patent Literature

Patent Literature 1: Japanese Patent Application Laid-Open No. 2001-252825

SUMMARY

Technical Problem

The multi-axis tapping device described in Patent Literature 1 has a purpose of changing the disposition of the spindles as appropriate according to the change of the portion of the workpiece being tapped. Therefore, the multi-axis tapping device is based on the premise that machining conditions (e.g., tool length and machining hole depth) are set the same for all the spindles. That is, in the multi-axis tapping device described in Patent Literature 1, there is no description concerning spindles having different machining conditions. There is no description either concerning how accuracy in the simultaneous performance of synchronous tapping with a plurality of tools is improved when spindles have different machining conditions.

The present invention has been devised in view of the above and it is an object of the present invention to obtain a numerical control device that can improve accuracy in the simultaneous performance of synchronous tapping with a plurality of tools when spindles have different machining conditions.

Solution to Problem

In order to solve the above problems and achieve the object, a numerical control device according to one aspect of the present invention is a numerical control device that controls a machine tool including a plurality of spindles that each rotate a tool opposed to a workpiece around a tool axis relative to the workpiece and a feed shaft that performs a feed operation such that a plurality of the tools relatively move closer to a plurality of the workpieces, the numerical control device including an associated-synchronous-tapping unit that associates, according to an associated-synchronous-tapping command, rotation and feed of a spindle on an associated side among the spindles with rotation and feed of a spindle on a reference side among the spindles and simultaneously performs synchronous tapping with the tools.

Advantageous Effects of Invention

According to the present invention, the associated-synchronous-tapping unit associates, according to the associated-synchronous-tapping command, the rotation and the feed of the spindle on the associated side among the spindles with the rotation and the feed of the spindle on the reference side among the spindles and simultaneously performs synchronous tapping with a plurality of tools. Consequently, it is possible to simultaneously accurately perform the synchronous tapping with a plurality of tools while taking into account the difference in machining conditions between the spindles. That is, it is possible to improve accuracy in simultaneously performing the synchronous tapping with a plurality of tools when spindles have different machining conditions.

DESCRIPTION OF EMBODIMENTS

Exemplary embodiments of a numerical control device according to the present invention are explained in detail below with reference to the drawings. Note that the present invention is not limited to the embodiments.

Embodiment

Figure 15:
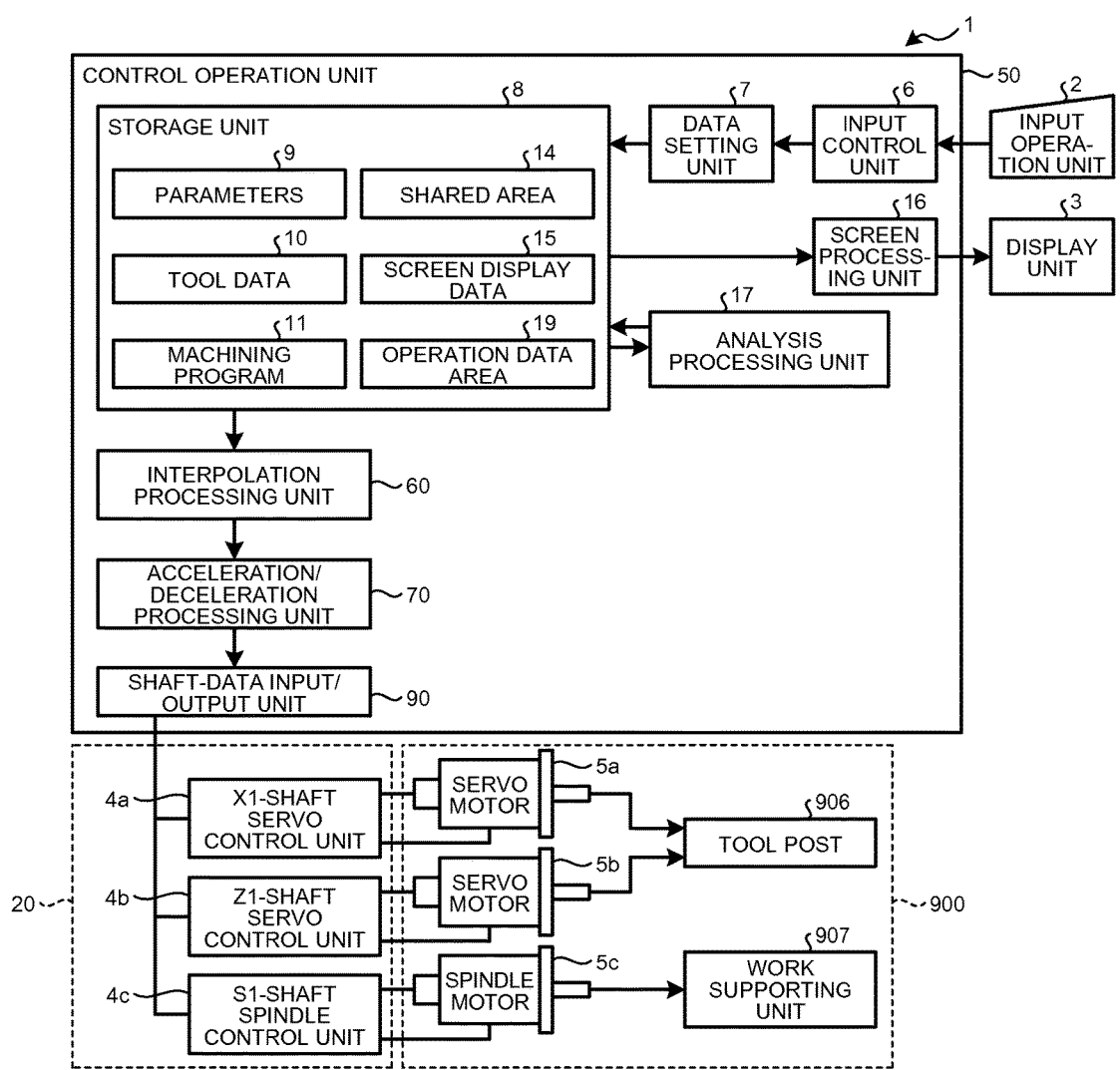
FIG. 15 is a diagram showing the configuration of a machine tool in a basic form.
Figure 16:
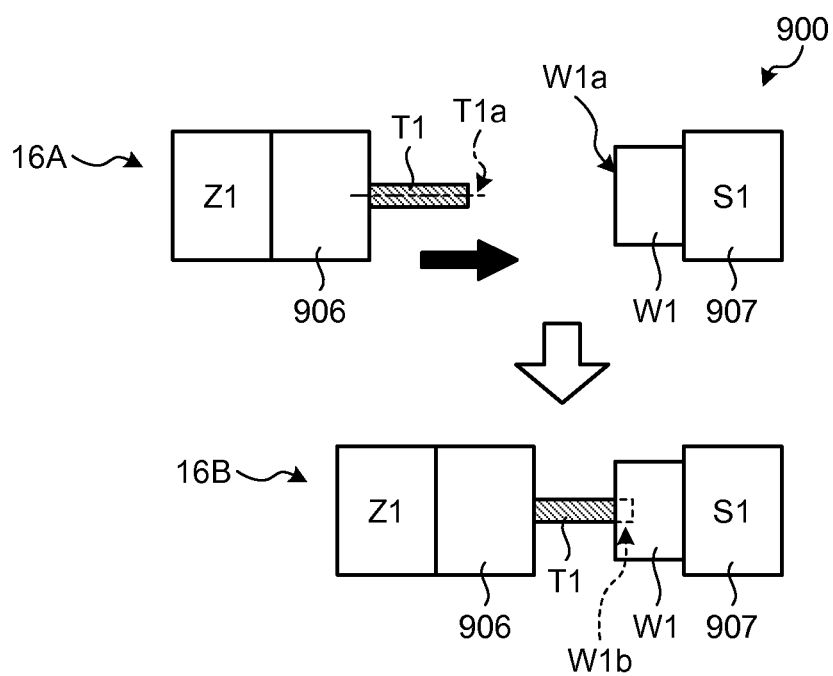
FIG. 16 is a diagram showing the configuration of the machine tool and a machining procedure for a workpiece in the basic form.

Before explaining a numerical control device 1$i$ according to an embodiment, the schematic configuration of a numerical control device 1 according to a basic form is explained with reference to FIG. 15 and FIG. 16. FIG. 15 is a block diagram showing the configuration of the numerical control device 1 according to the basic form. FIG. 16 is a diagram showing the configuration of a machine tool 900 and a machining procedure for a workpiece W1 in the basic form.

The machine tool 900 includes, as shown in FIG. 16, a tool post 906 and a workpiece supporting unit 907. The machine tool 900 includes an X1 shaft, a Z1 shaft, and an S1 shaft. The X1 shaft is a moving shaft for moving the tool post 906. The Z1 shaft is a moving shaft for moving the tool post 906 in a direction perpendicular to the X1 shaft. The extension line of a tool axis T1$a$ of the tool T1 crosses a surface to be machined W1$a$ on the workpiece W1. That is, the Z1 shaft is a feed shaft that performs a feed operation in a direction in which the tool T1 relatively moves closer to the workpiece W1 opposed to the tool T1. The S1 shaft is a rotating shaft for rotating the workpiece supporting unit 907 around the rotation center line parallel to the Z1 shaft. That is, the S1 shaft is a spindle for rotating the tool T1 opposed to the workpiece W1 around the tool axis T1$a$ relative to the workpiece W1.

The tool T1 is a tool for performing tapping, i.e., a tool for forming a female screw hole (tap) in the workpiece W1. That is, the tool T1 has, on the surface thereof, projections corresponding to the screw grooves that should be formed in the female screw hole. The numerical control device 1 controls the machine tool 900 and synchronizes the rotation and the feed of the S1 shaft (the spindle) such that synchronous tapping is performed.

Note that the Z1 shaft can be provided on the workpiece supporting unit 907 side to perform the feed operation in the direction in which the tool T1 relatively moves closer to the workpiece W1 opposed to the tool T1. The S1 shaft can be provided on the tool post 906 side to rotate the tool T1 opposed to the workpiece W1 around the tool axis T1$a$ relative to the workpiece W1.

The machine tool 900 further includes servomotors 5$a$ to 5$c$ as shown in FIG. 15. The servomotors 5$a$ and 5$b$ move the X1 shaft and the Z1 shaft (the feed shaft), respectively, with respect to the tool post 906. The spindle motor 5$c$ rotates the S1 shaft (the spindle).

The numerical control device 1 includes a display unit 3, an input operation unit 2, a control operation unit 50, and a driving unit 20. For example, according to the operation of an automatic start button of a machining program 11 by the user, a signal for an automatic start of the machining program 11 is supplied to the control operation unit 50. In response to the signal, the control operation unit 50 starts the machining program 11 and generates a movement amount command for the X1 shaft, a movement amount command and a moving speed command for the Z1 shaft, and a rotating speed command for the S1 shaft and supplies the commands to the driving unit 20 according to the machining program 11. The driving unit 20 includes an X1-shaft servo control unit 4$a$, a Z1-shaft servo control unit 4$b$, and an S1-shaft spindle control unit 4$c$. The driving unit 20 drives the servomotor 5$a$ for the X1 shaft, the servomotor 5$b$ for the Z1 shaft, and the spindle motor 5$c$ for the S1 shaft according to the movement amount command for the X1 shaft, the movement amount command and the moving speed command for the Z1 shaft, and the rotating speed command for the S1 shaft input from the control operation unit 50.

The control operation unit 50 includes a storage unit 8, an analysis processing unit 17, an interpolation processing unit 60, an acceleration/deceleration processing unit 70, a shaft-data input/output unit 90, an input control unit 6, a screen processing unit 16, and a data setting unit 7.

The signal for the automatic start of the machining program 11 is input to a machine-control-signal processing unit (not shown) via a PLC (not shown). The machine-control-signal processing unit instructs, via the storage unit 8, the analysis processing unit 17 to start the machining program 11.

The storage unit 8 stores therein parameters 9, tool data 10, the machining program 11, and screen display data 15 and includes a shared area 14 and an operation data area 19 functioning as work spaces. The tool data 10 is, for example, table data in which a tool correction number and a tool correction amount are associated by their relation to a plurality of correction numbers. It is possible to specify the tool correction amount corresponding to the tool correction number by referring to the tool data 10.

The analysis processing unit 17 reads the machining program 11 from the storage unit 8 and performs analysis processing on each block (each row) in the machining program 11 according to the start instruction from the machining program 11. For example, if a G code (e.g., a G code "G0" or "G1") is included in an analyzed block (row), the analysis processing unit 17 adds the tool correction amount to the result of the analysis and passes the analysis result to the interpolation processing unit 60.

The interpolation processing unit 60 receives the analysis result (a position command) from the analysis processing unit 17, performs interpolation processing on the analysis result (the position command), and supplies the result (a movement amount, a rotation amount, etc.) of the interpolation processing to the acceleration/deceleration processing unit 70.

The acceleration/deceleration processing unit 70 performs acceleration/deceleration processing on the result of the interpolation processing supplied from the interpolation processing unit 60. The acceleration/deceleration processing unit 70 directly outputs the result (feed speed, rotating speed, etc.) of the acceleration/deceleration processing concerning the X1 shaft, the Z1 shaft, and the S1 shaft to the shaft-data input/output unit 90.

For example, the numerical control device 1 controls machining of the workpiece W1 as shown in FIG. 16.

At step 16A in FIG. 16, the numerical control device 1 controls the Z1 shaft according to the description (e.g., the G code "G0") in the machining program 11 such that the tool T1 moves to the machining start position.

At step 16B in FIG. 16, the numerical control device 1 controls the S1 shaft and the Z1 shaft according to the description (e.g., the G code "G1") in the machining program 11 such that the tool T1 rotates around the tool axis Ta1 relative to the workpiece W1 (i.e., the S1 shaft rotates to rotate the workpiece W1), and a feed operation is performed such that the tool T1 relatively moves closer to the workpiece W1 (i.e., the Z1 shaft is moved to feed the S1 shaft and bring the tool T1 close to the workpiece W1). At this point, the numerical control device 1 synchronizes the rotation and the feed of the S1 shaft (the spindle) to perform synchronous tapping on the workpiece W1 with the tool T1. Consequently, it is possible to make the pitch of the screw grooves in the female screw hole W1$b$ substantially constant and thus highly accurately form the female screw hole W1$b$ in the workpiece W1.

When the female screw hole W1$b$ is formed in the workpiece W1, the numerical control device 1 controls the tool post 906 and the workpiece supporting unit 907 such that the rotating direction of the S1 shaft (the spindle) is reversed from the rotating direction during machining and synchronizes the rotation and the feed of the S1 shaft (the spindle) to extract the tool T1 from the female screw W1$b$. Consequently, it is possible to extract the tool T1 from the female screw hole W1$b$ while suppressing the interference by the tool T1 on the female screw hole W1$b$.

In the basic form, as shown in FIG. 15 and FIG. 16, only one female screw hole W1$b$ can be machined in one machining operation performed by the numerical control device 1. Therefore, the cycle time for machining tends to be long as a whole when a plurality of female screw holes are present that are desired to be machined.

In contrast, it is assumed that, in the numerical control device 1, a plurality of spindles and a plurality of tools are provided and the spindles are individually synchronized with a feed shaft independently from one another. In this case, the tools can be simultaneously rotated by the spindles and machining of the female screw holes can be simultaneously performed. Therefore, it is possible to reduce the cycle time for machining.

However, because the spindles are individually synchronized with the feed shaft independently from one another, when machining conditions (e.g., tool length and machining hole depth) are different for each spindle, it is likely that machining is performed while neglecting the differences in the machining conditions. Therefore, when the machining conditions are different for each spindle, it is likely that a plurality of tools cannot perform synchronous tapping simultaneously.

Therefore, in the present embodiment, rather than individually synchronizing the spindles with the feed shaft independently from one another, the numerical control device 1$i$ associates the rotation and the feed of a spindle on the associated side with the rotation and the feed of a spindle on the reference side and simultaneously performs synchronous tapping with a plurality of tools to aim at improving the accuracy and improving the cycle time through a reduction of the planning time in simultaneously performing synchronous tapping with a plurality of tools when machining conditions are different for each spindle.

Figure 1:
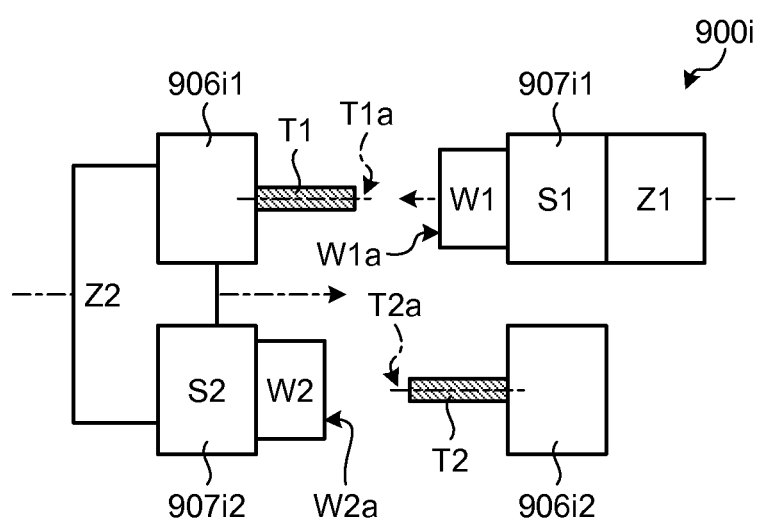
FIG. 1 is a diagram showing the configuration of a machine tool in an embodiment.
Figure 2:
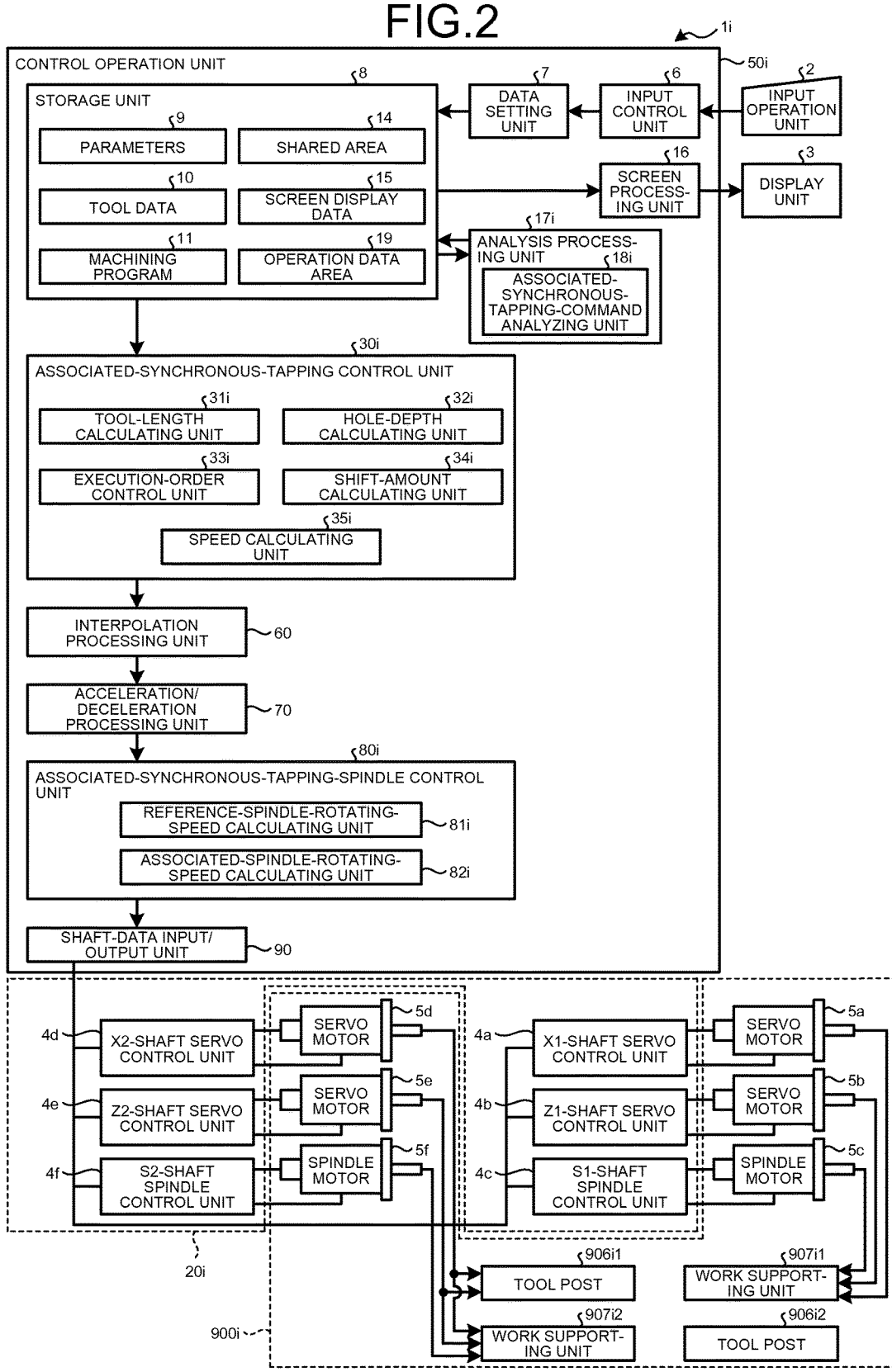
FIG. 2 is a diagram showing the configuration of a numerical control device according to the embodiment.

Specifically, in the numerical control device 1$i$, the actions below are performed. FIG. 1 is a diagram showing the configuration of a machine tool 900$i$ controlled by the numerical control device 1$i$ according to the embodiment. FIG. 2 is a block diagram showing the configuration of the numerical control device 1$i$ according to the first embodiment. In the following explanation, differences from the basic form are mainly explained.

The machine tool 900$i$ includes, as shown in FIG. 1, two tool posts 906$i$1 and 906$i$2 and two workpiece supporting units 907$i$1 and 907$i$2. The machine tool 900$i$ includes an X1 shaft, a Z1 shaft, an S1 shaft, an X2 shaft, a Z2 shaft, and an S2 shaft. In the machine tool 900$i$, two tools T1 and T2 are provided. The two tools T1 and T2 are opposed to the workpieces W1 and W2 corresponding thereto, respectively. In the machine tool 900$i$, the tool post 906$i$1 and the workpiece supporting unit 907$i$2 are provided on the Z2 shaft side and the workpiece supporting unit 907$i$1 and the tool post 906$i$2 are provided on the Z1 shaft side. The tool post 906$i$2 is fixed.

The Z1 shaft is a feed shaft that performs a feed operation in a direction in which the tool T1 relatively moves closer to the workpiece W1 opposed to the tool T1. The Z1 shaft is a feed shaft that performs a feed operation for changing the distance between the tool T1 and the workpiece W1 opposed to the tool T1. The S1 shaft is a rotating shaft that rotates the workpiece supporting unit 907$i$1 around the rotation center line parallel to the Z1 shaft. That is, the S1 shaft is a spindle that rotates the tool T1 opposed to the workpiece W1 around a tool axis T1$a$ relative to the workpiece W1.

The Z2 shaft is a feed shaft that performs a feed operation in directions in which the tools T1 and T2 respectively relatively move closer to the workpieces W1 and W2 opposed to the tools T1 and T2. The Z2 shaft performs a feed operation to simultaneously bring a plurality of tools T1 and T2 close to a plurality of workpieces W1 and W2. The S2 shaft is a rotating shaft that rotates the workpiece supporting unit 907$i$2 around the rotation center line parallel to the Z2 shaft. That is, the S2 shaft is a spindle that rotates the tool T2 opposed to the workpiece W2 around a tool axis T2$a$ relative to the workpiece W2.

The tool T2 is a tool for performing tapping, i.e., a tool for forming a female screw hole (tap) in the workpiece W2. That is, the tool T2 has, on the surface thereof, projections corresponding to the screw grooves that should be formed in the female screw hole. The numerical control device 1$i$ controls the machine tool 900$i$ and synchronizes the rotation and the feed of the S2 shaft (a spindle) such that synchronous tapping is performed.

The machine tool 900$i$ includes servomotors 5$a$ to 5$f$ as shown in FIG. 2. The servomotor 5$a$ moves the X1 shaft. The servomotor 5$b$ moves the Z1 shaft (a second feed shaft). The spindle motor 5$c$ rotates the S1 shaft (a spindle). The servomotors 5$d$ and 5$e$ respectively move the X2 shaft and the Z2 shaft (a feed shaft) with respect to the tool post 906$i$1 and the workpiece supporting unit 907$i$2. The spindle motor 5$f$ rotates the S2 shaft (a spindle).

Note that a driving unit 20$i$ includes the X1-shaft servo control unit 4$a$, the Z1-shaft servo control unit 4$b$, the S1-shaft spindle control unit 4$c$, an X2-shaft servo control unit 4$d$, a Z2-shaft servo control unit 4$e$, and an S2-shaft spindle control unit 4$f$ corresponding to the servomotors 5$a$ to 5$f$.

The numerical control device 1$i$ includes a control operation unit (an associated-synchronous-tapping unit) 50$i$ instead of the control operation unit 50 (see FIG. 15). The control operation unit 50$i$ includes an analysis processing unit 17*i* instead of the analysis processing unit 17 and includes an associated-synchronous-tapping control unit 30*i* and an associated-synchronous-tapping-spindle control unit 80*i*.

The analysis processing unit 17*i* includes an associated-synchronous-tapping-command analyzing unit 18*i*. The analysis processing unit 17*i* analyzes, for example, a machining program block by block (row by row). However, when an associated-synchronous-tapping command (see FIG. 3 and FIG. 6) is included in an analysis target block, the analysis processing unit 17*i* performs an analysis by using the associated-synchronous-tapping-command analyzing unit 18*i*. The associated-synchronous-tapping-command analyzing unit 18*i*, for example, analyzes an associated-synchronous-tapping command in the machining program and supplies the analysis result to the associated-synchronous-tapping control unit 30*i* via the storage unit 8.

The associated-synchronous-tapping control unit 30*i* shown in FIG. 2 performs control such that the rotation and the feed of the spindle on the associated side are associated with the rotation and the feed of the spindle on the reference side. For example, the associated-synchronous-tapping control unit 30*i* associates the rotation and the feed of the spindle on the associated side with the rotation and the feed of the spindle on the reference side such that the difference between the distance between the tool T2 of the spindle on the reference side (the S2 shaft) and the workpiece W2 and the distance between the tool T1 of the spindle on the associated side (the S1 shaft) and the workpiece W1 corresponds to the difference between the tool length of the spindle on the reference side (the S2 shaft) and the tool length of the spindle on the associated side (the S1 shaft). Alternatively, for example, the associated-synchronous-tapping control unit 30*i* associates the rotation and the feed of the spindle on the associated side with the rotation and the feed of the spindle on the reference side such that the difference between the distance between the tool T2 of the spindle on the reference side (the S2 shaft) and the workpiece W2 and the distance between the tool T1 of the spindle on the associated side (the S1 shaft) and the workpiece W1 corresponds to the difference between the machining hole depth of the spindle on the reference side (the S2 shaft) and the machining hole depth of the spindle on the associated side (the S1 shaft).

Specifically, the associated-synchronous-tapping control unit 30*i* includes a tool-length calculating unit 31*i*, a hole-depth calculating unit 32*i*, an execution-order control unit 33*i*, a shift-amount calculating unit 34*i*, and a speed calculating unit 35*i*.

The tool-length calculating unit 31*i* acquires a tool correction number "T1" for the tool T1 and a tool correction number "T2" for the tool T2 from the analysis processing unit 17*i* via the storage unit 8. The tool-length calculating unit 31*i* acquires tool correction amounts corresponding to the tool correction numbers "T1" and "T2" by referring to the tool data 10 in the storage unit 8. Consequently, the tool-length calculating unit 31*i* calculates a tool length Lt1 of the tool T1 and a tool length Lt2 of the tool T2 by, for example, adding the tool correction amounts to the reference tool length.

The hole-depth calculating unit 32*i* acquires a position command for the Z1 shaft and a position command for the Z2 shaft from the analysis processing unit 17*i* via the storage unit 8. The hole-depth calculating unit 32*i* calculates, according to the position command for the Z1 shaft and the position command for the Z2 shaft, a machining hole depth D1 of the female screw hole that should be machined by the tool T1 of the spindle (the S1 shaft) and a machining hole depth D2 of the female screw hole that should be machined by the tool T2 of the spindle (the S2 shaft). For example, in the case shown in FIG. 3, the machining hole depth D1 of the spindle (the S1 shaft) and the machining hole depth D2 of the spindle (the S2 shaft) are calculated as values equal to each other according to the position command for the Z1 shaft (the Z1 shaft=fixed) and the position command for the Z2 shaft (Z2=50). For example, when the tool distal end position of the tool T1 corresponding to the tool length Lt1 of the tool T1 calculated by the tool-length calculating unit 31*i* is represented by Zt1 and the position command for the Z2 shaft analyzed by the analysis processing unit 17*i* is represented by Zc2, the machining hole depths D1 and D2 can be calculated by the following Formula 1:

$$D1 = D2 = Zt1 - Zc2 \qquad \text{Formula 1}$$

Figures 5, 6:
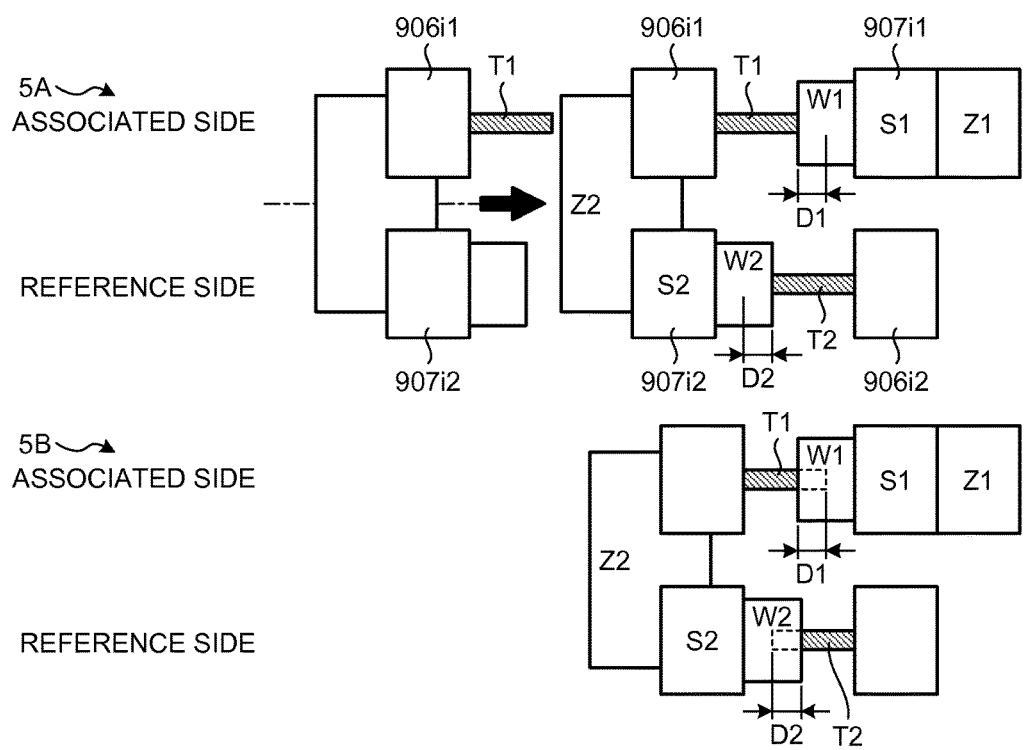
FIG. 5 is a diagram showing a machining procedure for machining a workpiece when the tool lengths and the machining hole depths of spindles are the same and the pitch is different for each spindle in the embodiment.
FIG. 6 is a diagram showing an example of an associated-synchronous-tapping command when moving the Z1 shaft in the embodiment.

Alternatively, when machining conditions (e.g., tool length and machining hole depth) are different for each spindle (e.g., in the case of the associated-synchronous-tapping command shown in FIG. 6), it is necessary to perform processing for moving the Z1 shaft and processing for moving the Z2 shaft and rotating the spindles (the S1 shaft and the S2 shaft). The execution-order control unit 33*i* controls the execution order of these kinds of processing.

For example, when the execution-order control unit 33*i* acquires the analysis result that machining conditions (e.g., tool length and machining hole depth) are different for each spindle, the execution-order control unit 33*i* generates a position command for moving the Z1 shaft at an interpolation cycle of the former half in the present block and generates a position command for moving the Z2 shaft at an interpolation cycle in the latter half. That is, the execution-order control unit 33*i* controls, in time series, the execution order of a plurality of kinds of processing in one block.

Alternatively, for example, when the execution-order control unit 33*i* acquires the analysis result that machining conditions (e.g., tool length and machining hole depth) are different for each spindle, the execution-order control unit 33*i* generates a position command for moving the Z2 shaft while generating a position command for the Z2 shaft at an interpolation cycle and moving the Z1 shaft in synchronization with the timing with which the distal ends of the tools T1 and T2 reach the workpieces W1 and W2 and generates a position command for moving the Z2 shaft. That is, the execution-order control unit 33*i* controls, in parallel, the execution orders of a plurality of processing in one block.

When the shift-amount calculating unit 34*i* acquires the analysis result that machining conditions (e.g., tool length and machining hole depth) are different for each spindle (e.g., in the case of the associated-synchronous-tapping command shown in FIG. 6), the shift-amount calculating unit 34*i* calculates a movement amount ΔZ1 for the Z1 shaft.

For example, the shift-amount calculating unit 34*i* calculates the movement amount of the Z1 shaft such that the difference between the distance between the tool T2 of the spindle on the reference side (the S2 shaft) and the workpiece W2 and the distance between the tool T1 of the spindle on the associated side (the S1 shaft) and the workpiece W1 corresponds to the difference between the tool length of the spindle on the reference side (the S2 shaft) and the tool length of the spindle on the associated side (the S1 shaft). For example, when the machining hole depth D1 and the machining hole depth D2 are equal to each other and the tool length Lt1 of the tool T1 and the tool length Lt2 of the tool T2 are different from each other, a movement amount $\Delta Z1a$ of the Z1 shaft can be calculated by the following Formula 2:

$$\Delta Z1a = Lt1 - Lt2 \qquad \text{Formula 2}$$

Alternatively, for example, the shift-amount calculating unit 34$i$ calculates the movement amount of the Z1 shaft such that the difference between the distance between the tool T2 of the spindle on the reference side (the S2 shaft) and the workpiece W2 and the distance between the tool T1 of the spindle on the associated side (the S1 shaft) and the workpiece W1 corresponds to the difference between the machining hole depth D2 of the spindle on the reference side (the S2 shaft) and the machining hole depth D1 of the spindle on the associated side (the S1 shaft). For example, when the tool length Lt1 of the tool T1 and the tool length Lt2 of the tool T2 are equal to each other and the machining hole depth D1 and the machining hole depth D2 are different from each other, a movement amount $\Delta Z1b$ of the Z1 shaft can be calculated by the following Formula 3:

$$\Delta Z1b = D1 - D2 \qquad \text{Formula 3}$$

The speed calculating unit 35$i$ acquires a pitch command on the reference side (e.g., "F2=0.5" shown in FIG. 3) and a speed command on the reference side (e.g., "S1000" shown in FIG. 3) from the analysis processing unit 17$i$ via the storage unit 8. The speed calculating unit 35$i$ calculates the feed speed of the spindle on the reference side, for example, by multiplying the indicated pitch on the reference side by the indicated rotating speed on the reference side. For example, when the indicated pitch on the reference side is represented by Pf2 and the indicated rotating speed on the reference side is represented by Nc2, the feed speed v2 of the Z2 shaft on the reference side can be calculated by the following Formula 4:

$$v2 = Pf2 \times Nc2 \qquad \text{Formula 4}$$

For example, when the speed calculating unit 35$i$ acquires the analysis result that machining conditions (e.g., tool length and machining hole depth) are different for each spindle, the speed calculating unit 35$i$ further calculates the feed speed of the spindle on the associated side. For example, when the tool length Lt1 of the tool T1 and the tool length Lt2 of the tool T2 are equal to each other and the machining hole depth D1 and the machining hole depth D2 are different from each other, because the time until the tool on the reference side reaches the hole bottom after reaching the workpiece surface is given by $\Delta t2 = D2/(v2)$, the feed speed v1 of the Z1 shaft on the associated side can be calculated by the following Formula 5:

$$\begin{aligned} v1 &= (D1 - D2)/(\Delta t2) \qquad \text{Formula 5} \\ &= v2(D1 - D2)/(D2) \end{aligned}$$

In Formula 5, $D1 \geq 0$ and $D2 \geq 0$. When $v1 > 0$, the Z1 shaft on the associated side moves in a direction in which the Z1 shaft approaches the Z2 shaft. When $v1 < 0$, the Z1 shaft on the associated side moves in a direction in which the Z1 shaft moves away from the Z2 shaft.

The associated-synchronous-tapping-spindle control unit 80$i$ calculates the rotating speed of the spindle on the reference side and the rotating speed of the spindle on the associated side such that the difference between the rotating speed of the spindle on the reference side and the rotating speed of the spindle on the associated side with respect to the same feed corresponds to the different pitches of the screw grooves that should be machined. Specifically, the associated-synchronous-tapping-spindle control unit 80$i$ includes a reference-spindle-rotating-speed calculating unit 81$i$ and an associated-spindle-rotating-speed calculating unit 82$i$.

The reference-spindle-rotating-speed calculating unit 81$i$ acquires the movement amount of the Z2 shaft, which is the feed shaft on the reference side, from the interpolation processing unit 60 via the acceleration/deceleration processing unit 70. The reference-spindle-rotating-speed calculating unit 81$i$ acquires a pitch command on the reference side from the analysis processing unit 17$i$ via the storage unit 8, the associated-synchronous-tapping control unit 30$i$, the interpolation processing unit 60, and the acceleration/deceleration processing unit 70. The reference-spindle-rotating-speed calculating unit 81$i$ calculates the movement amount (rotating speed) of the spindle on the reference side, for example, by dividing the movement amount of the Z2 shaft on the reference side by the pitch on the reference side. Consequently, it is possible to synchronize the movements (rotations) of the feed shaft on the reference side and the spindle on the reference side.

The associated-spindle-rotating-speed calculating unit 82$i$ acquires the movement amount of the Z2 shaft, which is the feed shaft on the reference side, and the movement amount of the Z1 shaft, which is the feed shaft on the associated side (e.g., the movement amount per control cycle calculated by the interpolation processing unit 60 using v1 calculated by the above Formula 5) from the interpolation processing unit 60 via the acceleration/deceleration processing unit 70. The associated-spindle-rotating-speed calculating unit 82$i$ acquires a pitch command on the associated side from the analysis processing unit 17$i$ via the storage unit 8, the associated-synchronous-tapping control unit 30$i$, the interpolation processing unit 60, and the acceleration/deceleration processing unit 70. The associated-spindle-rotating-speed calculating unit 82$i$ calculates the movement amount (rotating speed) of the spindle on the reference side by adding the movement amount of the Z2 shaft on the reference side and the movement amount of the Z1 shaft on the associated side and dividing the addition result by the pitch on the associated side. Consequently, the movement amount (the rotating speed) of the spindle can correspond to the pitch on the associated side and be synchronized with the feed shaft.

For example, when the Z1 shaft is fixed, if the calculated feed speed of the Z2 shaft on the reference side is represented by v2 and the feed speed of the Z1 shaft on the associated side is represented by v1, because the Z1 shaft is fixed, v1=0. When the indicated pitch on the associated side is represented by Pf1, the rotating speed N1 at which the spindle on the associated side (the S1 shaft) should be driven can be calculated by the following Formula 6:

$$\begin{aligned} N1 &= (v1 + v2)/(Pf1) \qquad \text{Formula 6} \\ &= v2/(Pf1) \\ &= Pf2 \times Nc2/(Pf1) \end{aligned}$$

Alternatively, for example, when machining conditions (e.g., tool length and machining hole depth) are different for each spindle, if the calculated feed speed of the Z2 shaft on the reference side is represented by v2 and the indicated pitch on the associated side is represented by Pf1, the feed speed v1 of the Z1 shaft on the associated side can be calculated by the above Formula 5. Therefore, the rotating speed N1 at which the spindle on the associated side (the S1 shaft) should be driven can be calculated by the following Formula 7:

$$N1 = (v1 + v2)/(Pf1) \quad \text{Formula 7}$$
$$= v2 \times D1/\{(D2) \times (Pf1)\}$$
$$= Pf2 \times Nc2 \times D1/\{(D2) \times (Pf1)\}$$

The associated-synchronous-tapping control unit 30i supplies the driving position and the feed speed of the Z1 shaft and the driving position and the feed speed of the Z2 shaft to the driving unit 20i via the interpolation processing unit 60, the acceleration/deceleration processing unit 70, the associated-synchronous-tapping-spindle control unit 80i, and the shaft-data input/output unit 90. The associated-synchronous-tapping-spindle control unit 80i supplies the driving rotating speed N2 of the spindle on the reference side (the S2 shaft) and the driving rotating speed N1 of the spindle on the associated side (the S1 shaft) to the driving unit 20i via the shaft-data input/output unit 90. Consequently, the X1 shaft, the Z1 shaft, the S1 shaft, the X2 shaft, the Z2 shaft, and the S2 shaft are driven in association with one another to associate the rotation and the feed of the spindle on the associated side with the rotation and the feed of the spindle on the reference side.

Figures 3, 4:
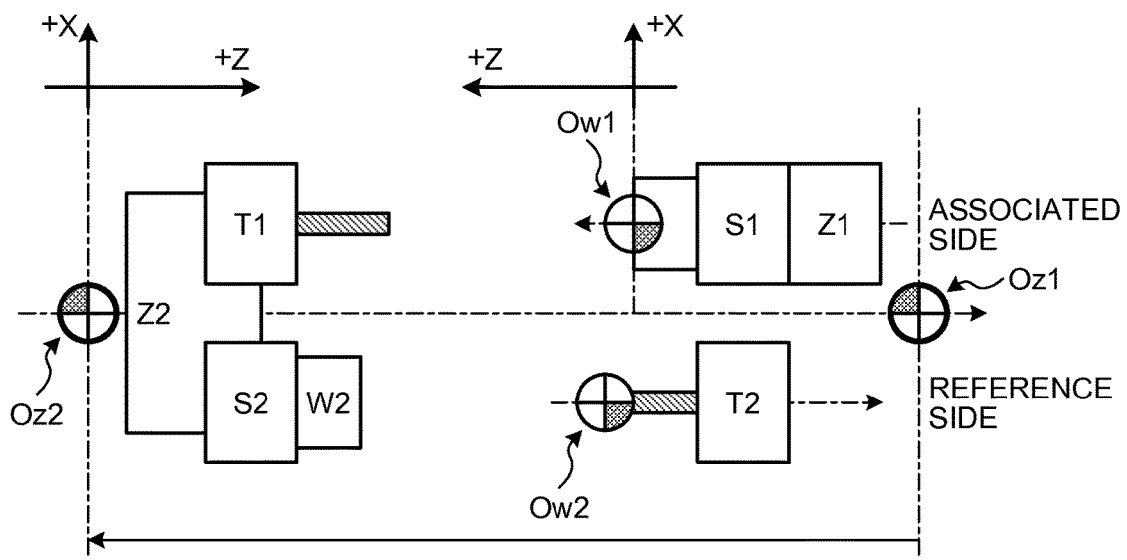
FIG. 3 is a diagram showing an associated-synchronous-tapping command when a Z1 shaft is fixed in the embodiment.
FIG. 4 is a diagram showing a workpiece coordinate system and a machine coordinate system in the embodiment.

An associated-synchronous-tapping command in the machining program 11 when the Z1 shaft is fixed is explained with reference to FIG. 3. FIG. 3 is a diagram showing the associated-synchronous-tapping command when the Z1 shaft is fixed.

The associated-synchronous-tapping command includes, for example, the code shown in FIG. 3. The G code "G180" indicates that the block including the G code "G180" is the associated-synchronous-tapping command.

The description "Z2=50." shown in FIG. 3 indicates a position command for the Z2 shaft corresponding to the position (mm) of a hole bottom that should be machined by the spindle S2. In the case shown in FIG. 3, because a description concerning "Z1" is omitted, an analysis reveals that a command for maintaining the Z1 shaft in a fixed state is given.

Note that a position command for the Z1 shaft is given with reference to a mechanical coordinate origin Oz1 of the Z1 shaft shown in FIG. 4. A position command for the Z2 shaft is given with reference to a mechanical coordinate origin Oz2 of the Z2 shaft shown in FIG. 4. In the mechanical coordinate system of the Z1 shaft, the direction from the mechanical coordinate origin Oz1 of the Z1 shaft to the mechanical coordinate origin Oz2 of the Z2 shaft is a +Z direction. In the mechanical coordinate system of the Z2 shaft, the direction from the mechanical coordinate origin Oz2 of the Z2 shaft to the mechanical coordinate origin Oz1 of the Z1 shaft is the +Z direction. FIG. 4 is a diagram showing a workpiece coordinate system and a mechanical coordinate system. Ow1 and Ow2 shown in FIG. 4 are respectively origins of workpiece coordinate systems on the associated side and the reference side.

The description "S1=S2" shown in FIG. 3 designates which spindle of a plurality of spindles is a spindle on the reference side and which spindle is a spindle on the associated side. In the case of FIG. 3, an analysis reveals that the spindle (the S2 shaft) on the rightmost side in the description "S1=S2" is the spindle on the reference side and the other shaft (the S1 shaft) is the spindle on the associated side.

Note that, when the spindle on the reference side or the spindle on the associated side is designated with a minus sign, an analysis reveals that the command indicates reverse tapping. For example, when "S1=−S2", an analysis reveals that the spindle on the associated side (the S1 shaft) is for forward tapping and the spindle on the reference side (the S2 shaft) is for reverse tapping. Alternatively, for example, when "−S1=S2", an analysis reveals that the spindle on the associated side (the S1 shaft) is for reverse tapping and the spindle on the reference side (the S2 shaft) is for forward tapping. For example, when "−S1=−S2", an analysis reveals that the spindle on the associated side (the S1 shaft) is for reverse tapping and the spindle on the reference side (the S2 shaft) is for reverse tapping.

The description "F1=1.0" indicates a pitch (mm) of screw grooves of a female screw hole that should be machined by the tool T1 of the spindle (the S1 shaft). The description "F2=0.5" indicates a pitch (mm) of screw grooves of a female screw hole that should be machined by the tool T2 of the spindle (the S2 shaft).

The description "S1000" indicates the rotating speed (rpm) of the spindle on the reference side. In the case of FIG. 3, because the S2 shaft is designated as the spindle on the reference side, the description "S1000" indicates the rotating speed of the S2 shaft.

The description "T1" indicates a tool correction number of a tool on the associated side. In the case of FIG. 3, an analysis reveals that the tool T1 with the tool correction number "T1" is designated as the tool on the associated side. The analysis processing unit 17i supplies, for example, the tool correction number "T1" to the associated-synchronous-tapping control unit 30i via the storage unit 8.

Note that the tool on the reference side is designated by a T command or the like in advance before an associated-synchronous-tapping command. In the case of FIG. 3, an analysis reveals that the tool T2 with the tool correction number "T2" is designated in advance as the tool on the reference side. The analysis processing unit 17i supplies, for example, the tool correction number "T2" to the associated-synchronous-tapping control unit 30i via the storage unit 8.

A machining procedure for machining a workpiece when the tool lengths and the machining hole depths of the spindles are the same and the pitch is different for each spindle is explained with reference to FIG. 5.

At step 5A, the numerical control device 1i controls the Z2 shaft according to the associated-synchronous-tapping command (e.g., the description "G180" shown in FIG. 3) in the machining program 11 such that the tools T1 and T2 move respectively to the machining start positions.

At step 5B, the numerical control device 1i controls the S1 shaft, the S2 shaft, and the Z2 shaft according to the associated-synchronous-tapping command in the machining program 11 (e.g., the description "Z2=50. S1=S2 F1=1.0 F2=0.5 S1000 T1" shown in FIG. 3) such that the tool T1 rotates around the tool axis Ta1 relative to the workpiece W1 (i.e., the S1 shaft rotates to rotate the workpiece W1) and the tool T2 rotates around the tool axis Ta2 relative to the workpiece W2 (i.e., the S2 shaft rotates to rotate the workpiece W2), and a feed operation is performed such that the tools T1 and T2 relatively move closer to the workpieces W1 and W2, respectively (i.e., the Z2 shaft is moved to feed the S1 shaft and the S2 shaft and bring the tools T1 and T2 close to the workpieces W1 and W2, respectively). At this point, the numerical control device 1i associates the rotation and the feed of the spindle on the associated side with the rotation and the feed of the spindle on the reference side such that the difference between the rotating speed of the spindle on the reference side (the S2 shaft) and the rotating speed of the spindle on the associated side (the S1 shaft) with respect to the same feed corresponds to the different pitches of the screw grooves that should be machined, and simultaneously performs synchronous tapping on a plurality of workpieces W1 and W2 with a plurality of tools T1 and T2.

For example, in the case shown in FIG. 3, the indicated pitch (F2) on the reference side is Pf2=0.5 mm and the indicated rotating speed (S) on the reference side is Nc2=1000 rpm. Therefore, the feed speed of the Z2 shaft is calculated to be v2=500 mm/min from the above Formula 4. The indicated pitch (F1) on the associated side is Pf1=1.0 mm and the feed speed of the Z2 shaft is v2=500 mm/min. Therefore, the driving rotating speed of the spindle on the associated side (the S1 shaft) is calculated to be N1=500 rpm from the above Formula 6.

Alternatively, for example, when the indicated pitch (F2) on the reference side is Pf2=1 mm and the indicated rotating speed (S) on the reference side is Nc2=1000 rpm, the feed speed of the Z2 shaft is calculated to be v2=1000 mm/min from the above Formula 4. When it is assumed that the indicated pitch (F1) on the associated side is Pf1=0.5 mm, because the feed speed of the Z2 shaft is v2=1000 mm/min, the driving rotating speed of the spindle on the associated side (the S1 shaft) is calculated to be N1=2000 rpm from the above Formula 6.

Alternatively, for example, when the indicated pitch (F2) on the reference side is Pf2=0.75 mm and the indicated rotating speed (S) on the reference side is Nc2=1000 rpm, the feed speed of the Z2 shaft is calculated to be v2=750 mm/min from the above Formula 4. When it is assumed that the indicated pitch (F1) on the associated side is Pf1=0.5 mm, because the feed speed of the Z2 shaft is v2=750 mm/min, the driving rotating speed of the spindle on the associated side (the S1 shaft) is calculated to be N1=1500 rpm from the above Formula 6.

As explained above, when the pitch of the screw grooves that should be machined is different for each spindle, it is possible to simultaneously accurately perform synchronous tapping on the workpieces W1 and W2 with the tools T1 and T2.

An associated-synchronous-tapping command of a machining program when moving the Z1 shaft is explained with reference to FIG. 6. FIG. 6 is a diagram showing the associated-synchronous-tapping command when moving the Z1 shaft.

In the associated-synchronous-tapping command shown in FIG. 6, a description concerning "Z1" is included. That is, "Z1=55." indicates a position command for the Z1 shaft corresponding to the position (mm) of a hole bottom that should be machined by the spindle S1. In the case shown in FIG. 6, because the description concerning "Z1" is clearly shown, an analysis reveals that a position command for the Z1 shaft for moving the Z1 shaft is given.

For example, in the case shown in FIG. 6, the difference Z1−Z2=5 mm between a position command Z1=55 mm for the Z1 shaft and a position command Z2=50 mm for the Z2 shaft corresponds to the difference D1−D2 (≡5 mm) between the machining hole depth D1 of the spindle (the S1 shaft) and the machining hole depth D2 of the spindle (the S2 shaft).

Figure 7:
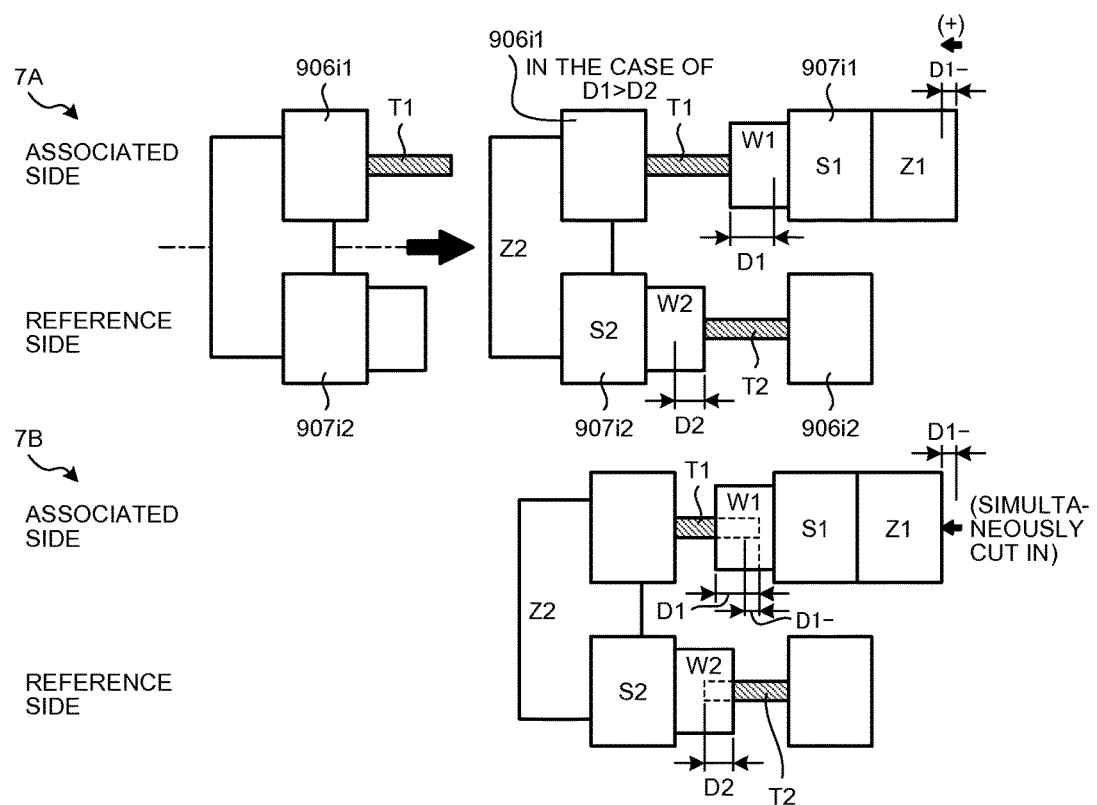
FIG. 7 is a diagram showing a machining procedure for machining a workpiece when the tool lengths of spindles are the same and the machining hole depth and the pitch are different for each spindle in the embodiment.

A machining procedure for machining a workpiece when the tool lengths of the spindles are the same and the machining hole depth and the pitch are different for each spindle is explained with reference to FIG. 7. In an example shown in FIG. 7, the machining hole depth D1 is larger than the machining hole depth D2 (D1>D2).

At step 7A, the numerical control device 1i controls the Z2 shaft according to the associated-synchronous-tapping command (e.g., the description "G180" shown in FIG. 6) in the machining program 11 such that the tools T1 and T2 move respectively to the machining start positions.

At step 7B, the numerical control device 1i controls the S1 shaft, the S2 shaft, the Z1 shaft, and the Z2 shaft according to the associated-synchronous-tapping command (e.g., the description "Z1=55. Z2=50. S1=S2 F1=1.0 F2=0.5 S1000 T1" shown in FIG. 6) in the machining program 11 such that the tool T1 rotates around the tool axis Ta1 relative to the workpiece W1 (i.e., the S1 shaft rotates to rotate the workpiece W1) and the tool T2 rotates around the tool axis Ta2 relative to the workpiece W2 (i.e., the S2 shaft rotates to rotate the workpiece W2), and a feed operation is performed such that the tools T1 and T2 relatively move closer to the workpieces W1 and W2, respectively (i.e., the Z2 shaft is moved to feed the S1 shaft and the S2 shaft and bring the tools T1 and T2 close to the workpieces W1 and W2, respectively). At this point, the numerical control device 1i associates the rotation and the feed of the spindle on the associated side with the rotation and the feed of the spindle on the reference side such that the difference between the distance between the tool T2 of the spindle on the reference side (the S2 shaft) and the workpiece W2 and the distance between the tool T1 of the spindle on the associated side (the S1 shaft) and the workpiece W1 corresponds to the difference between the machining hole depth D2 of the spindle on the reference side (the S2 shaft) and the machining hole depth D1 of the spindle on the associated side (the S1 shaft), and simultaneously performs the synchronous tapping on the workpieces W1 and W2 with the tools T1 and T2. That is, because D1>D2, the numerical control device 1i moves the Z1 shaft in the +Z direction.

For example, in the case shown in FIG. 6, the indicated pitch (F2) on the reference side is Pf2=0.5 mm and the indicated rotating speed (S) on the reference side is Nc2=1000 rpm. Therefore, the feed speed of the Z2 shaft is calculated to be v2=500 mm/min from the above Formula 4. When it is assumed that the machining hole depth D2 on the reference side is 5 mm and the machining hole depth D1 on the associated side is 10 mm, the indicated pitch (F1) on the associated side is Pf1=1.0 mm and the feed speed of the Z2 shaft is v2=500 mm/min. Therefore, the feed speed of the Z1 shaft is calculated to be 500 mm/min from the above Formula 5 and the driving rotating speed of the spindle on the associated side (the S1 shaft) is calculated to be N1=1000 rpm from the above Formula 7.

Alternatively, for example, when the indicated pitch (F2) on the reference side is Pf2=0.5 mm and the indicated rotating speed (S) on the reference side is Nc2=1500 rpm, the feed speed of the Z2 shaft is calculated to be v2=750 mm/min from the above Formula 4. When it is assumed that the machining hole depth D2 on the reference side is 6 mm, the machining hole depth D1 on the associated side is 10 mm, and the indicated pitch (F1) on the associated side is Pf1=0.75 mm, because the feed speed of the Z2 shaft is v2=750 mm/min, the feed speed of the Z1 shaft is calculated to be 500 mm/min from the above Formula 5 and the driving rotating speed of the spindle on the associated side (the S1 shaft) is calculated to be N1≡1667 rpm from the above Formula 7.

As explained above, when the machining hole depth that should be machined and the pitch of the screw grooves that should be machined are different for each spindle, it is possible to simultaneously accurately perform the synchronous tapping on the workpieces W1 and W2 with the tools T1 and T2.

Figure 8:
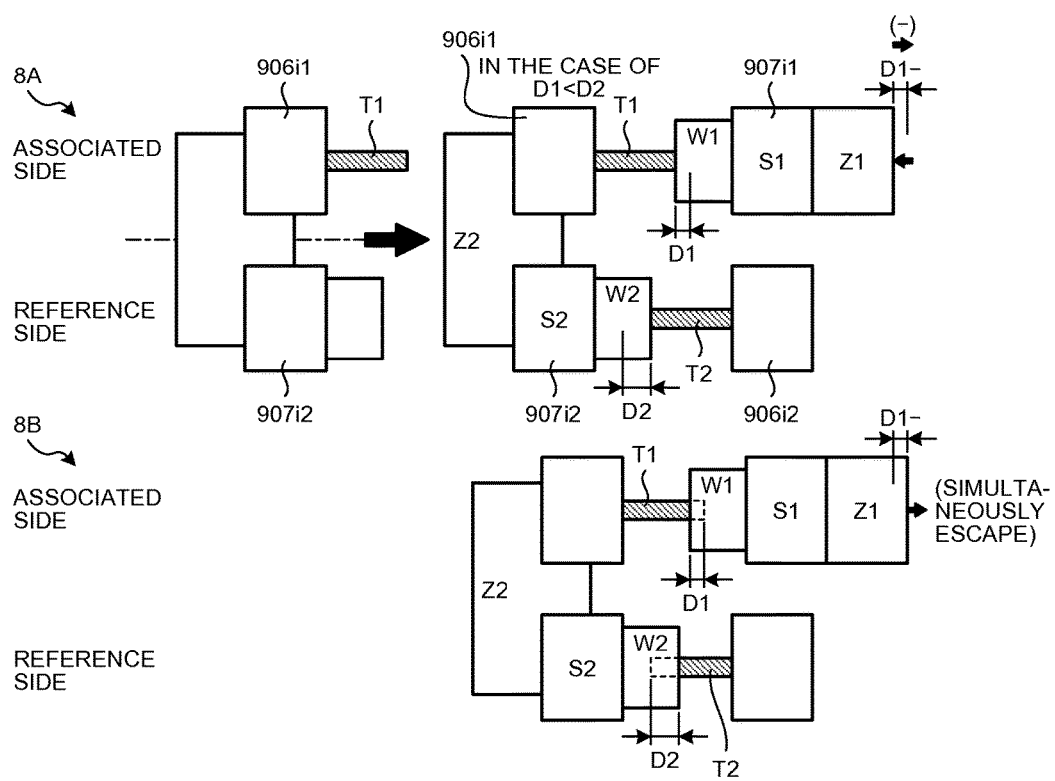
FIG. 8 is a diagram showing a machining procedure for machining a workpiece when the tool lengths of spindles are the same and the machining hole depth and the pitch are different for each spindle in the embodiment.

A machining procedure for machining a workpiece when the tool lengths of the spindles are the same and the machining hole depth and the pitch are different for each spindle is explained with reference to FIG. 8. In an example shown in FIG. 8, the machining hole depth D1 is smaller than the machining hole depth D2 (D1<D2).

At step 8A, the numerical control device 1*i* controls the Z2 shaft according to the associated-synchronous-tapping command (e.g., the description "G180" shown in FIG. 6) in the machining program 11 such that the tools T1 and T2 move respectively to the machining start positions.

At step 8B, the numerical control device 1*i* controls the S1 shaft, the S2 shaft, the Z1 shaft, and the Z2 shaft according to the associated-synchronous-tapping command (e.g., the description "Z1=55. Z2=50. S1=S2 F1=1.0 F2=0.5 S1000 T1" shown in FIG. 6) in the machining program 11 such that the tool T1 rotates around the tool axis Ta1 relative to the workpiece W1 (i.e., the S1 shaft rotates to rotate the workpiece W1) and the tool T2 rotates around the tool axis Ta2 relative to the workpiece W2 (i.e., the S2 shaft rotates to rotate the workpiece W2), and a feed operation is performed such that the tools T1 and T2 relatively move closer to the workpieces W1 and W2, respectively (i.e., the Z2 shaft is moved to feed the S1 shaft and the S2 shaft and bring the tools T1 and T2 close to the workpieces W1 and W2, respectively). At this point, the numerical control device 1*i* associates the rotation and the feed of the spindle on the associated side with the rotation and the feed of the spindle on the reference side such that the difference between the distance between the tool T2 of the spindle on the reference side (the S2 shaft) and the workpiece W2 and the distance between the tool T1 of the spindle on the associated side (the S1 shaft) and the workpiece W1 corresponds to the difference between the machining hole depth D2 of the spindle on the reference side (the S2 shaft) and the machining hole depth D1 of the spindle on the associated side (the S1 shaft), and simultaneously performs the synchronous tapping on the workpieces W1 and W2 with the tools T1 and T2. That is, because D1<D2, the numerical control device 1*i* moves the Z1 shaft in the −Z direction.

For example, when the indicated pitch (F2) on the reference side is Pf2=0.5 mm and the indicated rotating speed (S) on the reference side is Nc2=1500 rpm, the feed speed of the Z2 shaft is calculated to be v2=750 mm/min from the above Formula 4. When it is assumed that the machining hole depth D2 on the reference side is 6 mm and the machining hole depth D1 on the associated side is 4 mm, and, the indicated pitch (F1) on the associated side is Pf1=0.75 mm, because the feed speed of the Z2 shaft is v2=750 mm/min, the feed speed of the Z1 shaft is calculated to be −250 mm/min from the above Formula 5 and the driving rotating speed of the spindle on the associated side (the S1 shaft) is calculated to be N1≅667 rpm from the above Formula 7.

As explained above, when the machining hole depth that should be machined and the pitch of the screw grooves that should be machined are different for each spindle, it is possible to simultaneously accurately perform the synchronous tapping on the workpieces W1 and W2 with the tools T1 and T2.

Figure 9:
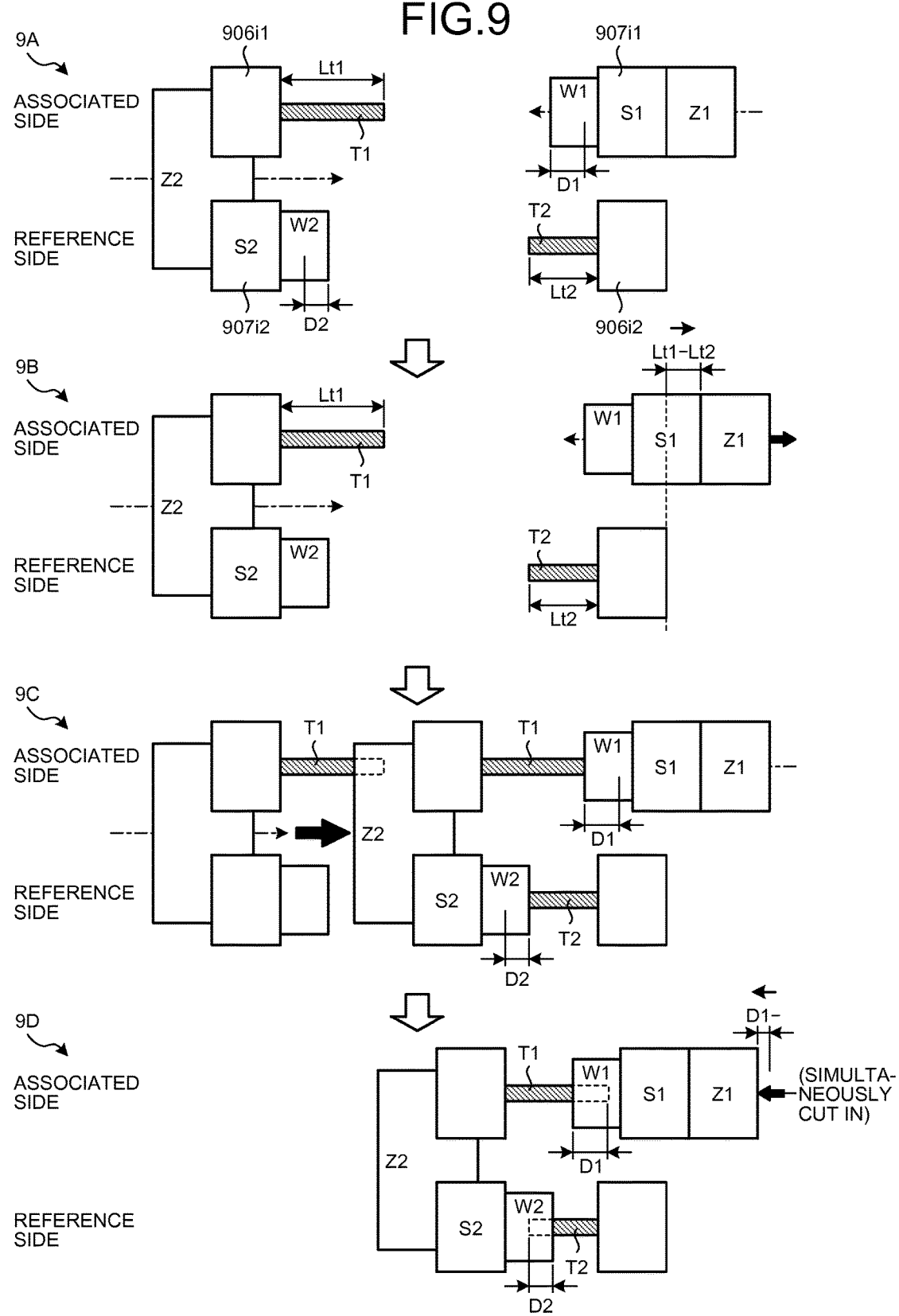
FIG. 9 is a diagram showing a machining procedure for machining a workpiece when the tool length, the machining hole depth, and the pitch are different for each spindle in the embodiment.

A machining procedure for machining a workpiece when the tool length, the machining hole depth, and the pitch are different for each spindle is explained with reference to FIG. 9. In an example shown in FIG. 9, the tool length Lt1 of the tool T1 is larger than the tool length Lt2 of the tool T2 (Lt1>Lt2) and the machining hole depth D1 is larger than the machining hole depth D2 (D1>D2).

At step 9A, the numerical control device 1*i* controls the Z2 shaft according to the positioning command (G00, etc.) in the machining program 11 such that the tools T1 and T2 move to the reference positions.

At step 9B, the numerical control device 1*i* controls the Z1 shaft according to the associated-synchronous-tapping command (e.g., the description "T1" shown in FIG. 9) in the machining program 11 such that the tool T1 moves relative to the workpiece W1 and the distance between the tool T1 and the workpiece W1 is changed. At this point, the numerical control device 1*i* associates the rotation and the feed of the spindle on the associated side with the rotation and the feed of the spindle on the reference side such that the difference between the distance between the tool T2 of the spindle on the reference side (the S2 shaft) and the workpiece W2 and the distance between the tool T1 of the spindle on the associated side (the S1 shaft) and the workpiece W1 corresponds to the difference between the tool length Lt2 of the spindle on the reference side (the S2 shaft) and the tool length Lt1 of the spindle on the associated side (the S1 shaft). That is, because Lt1>Lt2, the numerical control device 1*i* moves the Z1 shaft by the movement amount of Lt1−Lt2 in the −Z direction.

At step 9C, the numerical control device 1*i* controls the Z2 shaft according to the associated-synchronous-tapping command (e.g., the description "G180" shown in FIG. 6) in the machining program 11 such that the tools T1 and T2 move respectively to the machining start positions. At this point, because the distance between the tool T1 and the workpiece W1 is changed at step 9B, it is possible to cause the distal ends of the two tools T1 and T2 to substantially simultaneously reach the surfaces of the workpieces W1 and W2.

At step 9D, the numerical control device 1*i* controls the S1 shaft, the S2 shaft, the Z1 shaft, and the Z2 shaft according to the associated-synchronous-tapping command (e.g., the description "Z1=55. Z2=50. S1=S2 F1=1.0 F2=0.5 S1000 T1" shown in FIG. 6) in the machining program 11 such that the tool T1 rotates around the tool axis Ta1 relative to the workpiece W1 (i.e., the S1 shaft rotates to rotate the workpiece W1) and the tool T2 rotates around the tool axis Ta2 relative to the workpiece W2 (i.e., the S2 shaft rotates to rotate the workpiece W2), and a feed operation is performed such that the tools T1 and T2 relatively move closer to the workpieces W1 and W2, respectively (i.e., the Z2 shaft is moved to feed the S1 shaft and the S2 shaft and bring the tools T1 and T2 close to the workpieces W1 and W2, respectively). At this point, the numerical control device 1*i* associates the rotation and the feed of the spindle on the associated side with the rotation and the feed of the spindle on the reference side such that the difference between the distance between the tool T2 of the spindle on the reference side (the S2 shaft) and the workpiece W2 and the distance between the tool T1 of the spindle on the associated side (the S1 shaft) and the workpiece W1 corresponds to the difference between the machining hole depth D2 of the spindle on the reference side (the S2 shaft) and the machining hole depth D1 of the spindle on the associated side (the S1 shaft), and simultaneously performs the synchronous tapping on the workpieces W1 and W2 with the tools T1 and T2. That is, because D1>D2, the numerical control device 1*i* moves the Z1 shaft in the +Z direction.

As explained above, when the tool length of the tool, the pitch of screw grooves that should be machined, and the machining hole depth are different for each spindle, it is possible to simultaneously accurately perform the synchronous tapping on the workpieces W1 and W2 with the tools T1 and T2.

Figure 10:
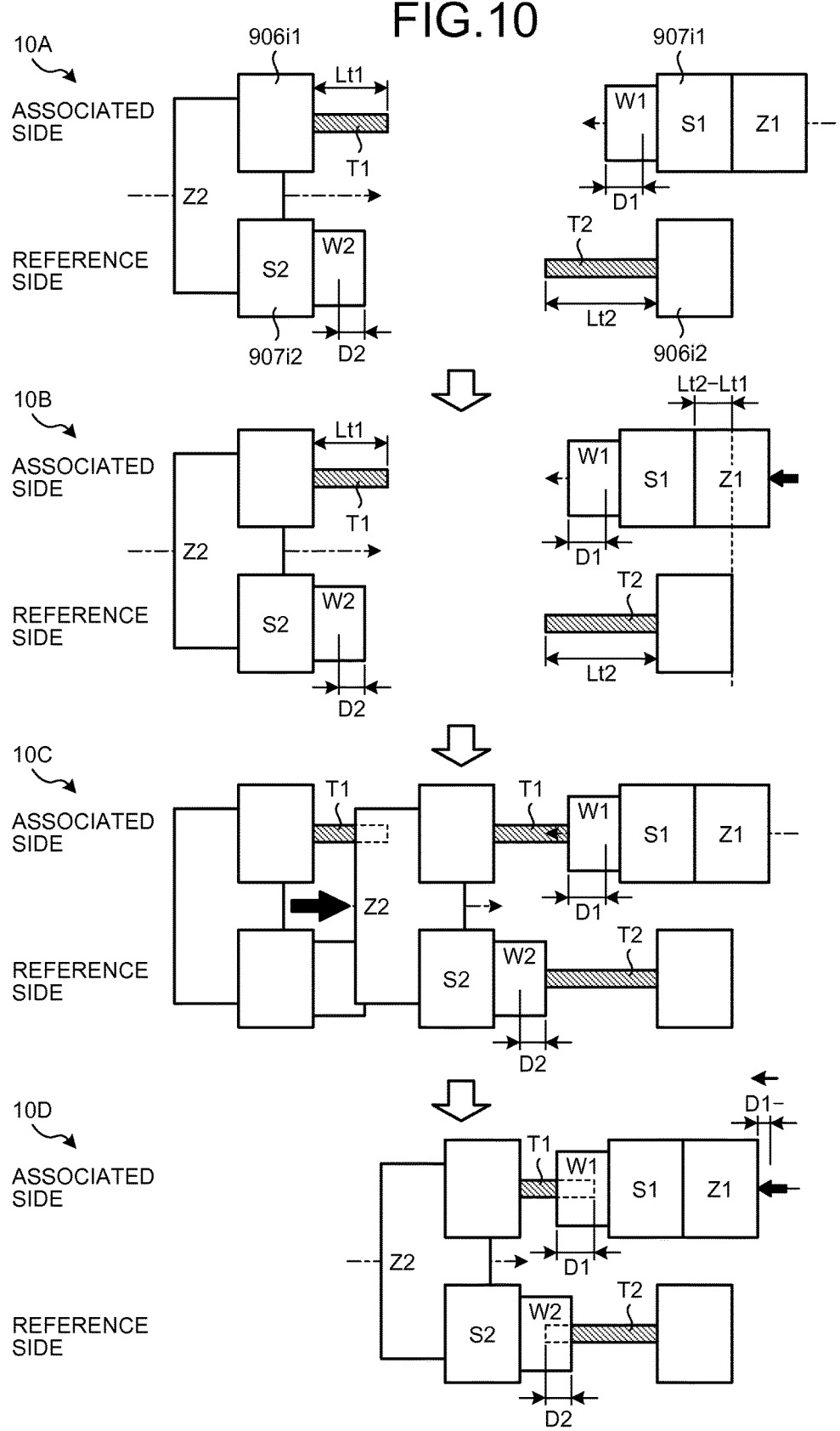
FIG. 10 is a diagram showing a machining procedure for machining a workpiece when the tool length, the machining hole depth, and the pitch are different for each spindle in the embodiment.

A machining procedure for machining a workpiece when the tool length, the machining hole depth, and the pitch are different for each spindle is explained with reference to FIG. 10. In an example shown in FIG. 10, the tool length Lt1 of the tool T1 is smaller than the tool length Lt2 of the tool T2 (Lt1<Lt2) and the machining hole depth D1 is larger than the machining hole depth D2 (D1>D2).

At step 10A, the numerical control device 1i controls the Z2 shaft according to the positioning command (G00, etc.) in the machining program 11 such that the tools T1 and T2 move to the reference positions.

At step 10B, the numerical control device 1i controls the Z1 shaft according to the associated-synchronous-tapping command (e.g., the description "T1" shown in FIG. 6) in the machining program 11 such that the tool T1 moves relative to the workpiece W1 and the distance between the tool T1 and the workpiece W1 is changed. At this point, the numerical control device 1i associates the rotation and the feed of the spindle on the associated side with the rotation and the feed of the spindle on the reference side such that the difference between the distance between the tool T2 of the spindle on the reference side (the S2 shaft) and the workpiece W2 and the distance between the tool T1 of the spindle on the associated side (the S1 shaft) and the workpiece W1 corresponds to the difference between the tool length Lt2 of the spindle on the reference side (the S2 shaft) and the tool length Lt1 of the spindle on the associated side (the S1 shaft). That is, because Lt1<Lt2, the numerical control device 1i moves the Z1 shaft by the movement amount of Lt2−Lt1 in the +Z direction.

At step 10C, the numerical control device 1i controls the Z2 shaft according to the associated-synchronous-tapping command (e.g., the description "G180" shown in FIG. 6) in the machining program 11 such that the tools T1 and T2 move respectively to the machining start positions. At this point, because the distance between the tool T1 and the workpiece W1 is changed at step 10B, it is possible to cause the distal ends of the two tools T1 and T2 to substantially simultaneously reach the surfaces of the workpieces W1 and W2.

At step 10D, the numerical control device 1i controls the S1 shaft, the S2 shaft, the Z1 shaft, and the Z2 shaft according to the associated-synchronous-tapping command (e.g., the description "Z1=55. Z2=50. S1=S2 F1=1.0 F2=0.5 S1000 T1" shown in FIG. 6) in the machining program 11 such that the tool T1 rotates around the tool axis Ta1 relative to the workpiece W1 (i.e., the S1 shaft rotates to rotate the workpiece W1) and the tool T2 rotates around the tool axis Ta2 relative to the workpiece W2 (i.e., the S2 shaft rotates to rotate the workpiece W2), and a feed operation is performed such that the tools T1 and T2 relatively move closer to the workpieces W1 and W2, respectively (i.e., the Z2 shaft is moved to feed the S1 shaft and the S2 shaft and bring the tools T1 and T2 close to the workpieces W1 and W2, respectively). At this point, the numerical control device 1i associates the rotation and the feed of the spindle on the associated side with the rotation and the feed of the spindle on the reference side such that the difference between the distance between the tool T2 of the spindle on the reference side (the S2 shaft) and the workpiece W2 and the distance between the tool T1 of the spindle on the associated side (the S1 shaft) and the workpiece W1 corresponds to the difference between the machining hole depth D2 of the spindle on the reference side (the S2 shaft) and the machining hole depth D1 of the spindle on the associated side (the S1 shaft), and simultaneously performs the synchronous tapping on the workpieces W1 and W2 with the tools T1 and T2. That is, because D1>D2, the numerical control device 1i moves the Z1 shaft in the +Z direction.

As explained above, when the tool length of the tool, the pitch of screw grooves that should be machined, and the machining hole depth are different for each spindle, it is possible to simultaneously accurately perform the synchronous tapping on the workpieces W1 and W2 with the tools T1 and T2.

Figure 11:
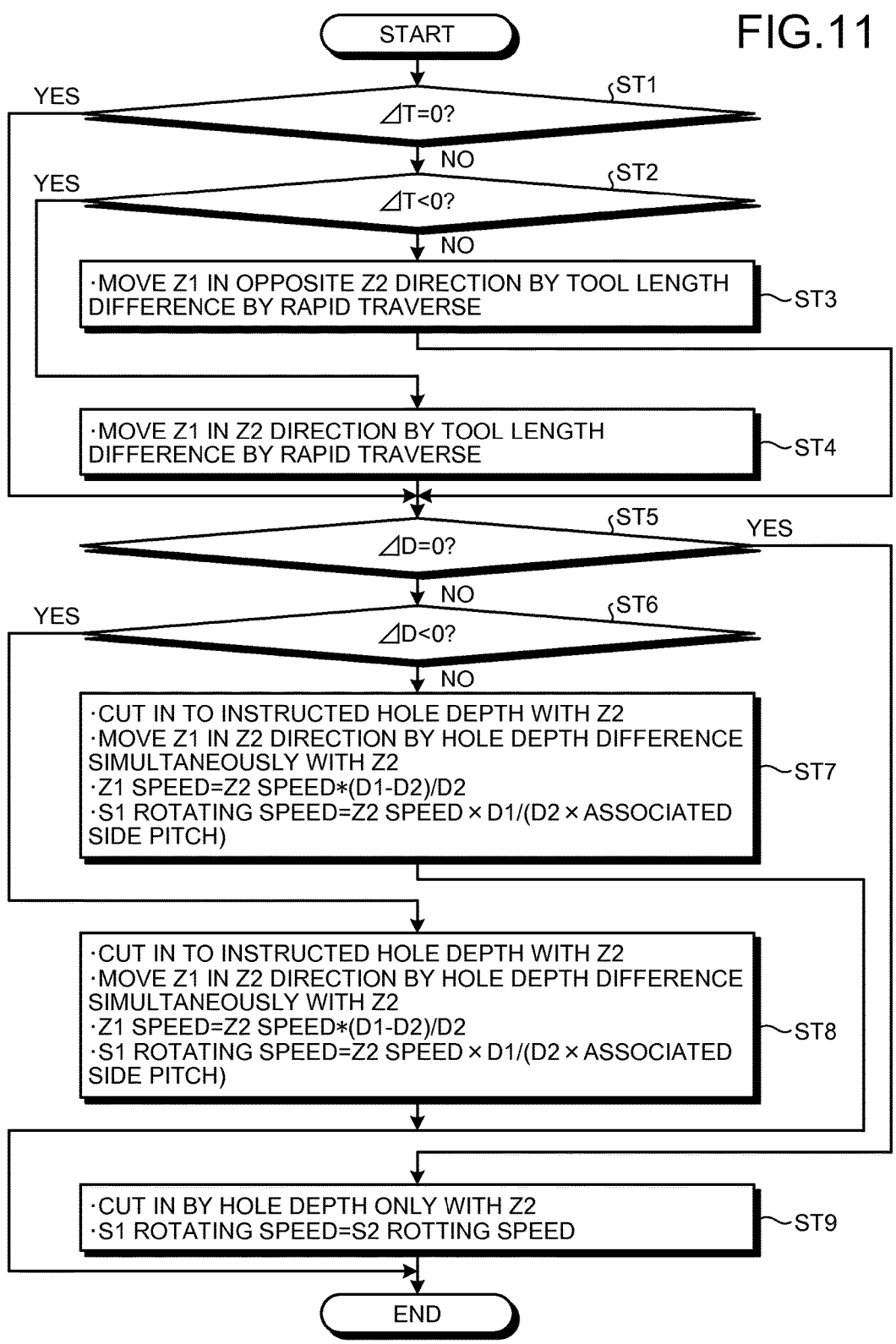
FIG. 11 is a flowchart describing the operation of the numerical control device according to the embodiment.

The operation of the numerical control device 1i according to the embodiment is explained with reference to FIG. 11. FIG. 11 is a flowchart describing the operation of the numerical control device 1i according to the embodiment.

At step ST1, the numerical control device 1i recognizes, according to the associated synchronous command, the spindle on the reference side and the spindle on the associated side among a plurality of spindles. For example, in the case of the associated-synchronous-tapping commands shown in FIG. 3 and FIG. 6, the numerical control device 1i recognizes that the S2 shaft is the spindle on the reference side and the S1 shaft is the spindle on the associated side. The numerical control device 1i calculates the tool length Lt2 of the spindle on the reference side (the S2 shaft) and the tool length Lt1 of the spindle on the associated side (the S1 side) and calculates the tool length difference $\Delta T = Lt1 - Lt2$. The numerical control device 1i determines whether the tool length difference $\Delta T$ is approximately zero (i.e., the absolute value of the tool length difference $\Delta T$ is smaller than a threshold). When the tool length difference $\Delta T$ is approximately zero ("Yes" at step ST1), the numerical control device 1i advances the processing to step ST5. When the tool length difference $\Delta T$ is not approximately zero ("No" at step ST1), the numerical control device 1i advances the processing to step ST2.

At step ST2, the numerical control device 1i determines whether the tool length difference $\Delta T$ is smaller than zero (i.e., the absolute value is equal to or larger than the threshold and the tool length difference $\Delta T$ is a negative value). When the tool length difference $\Delta T$ is smaller than zero ("Yes" at step ST2), the numerical control device 1i advances the processing to step ST4. When the tool length difference $\Delta T$ is equal to or larger than zero ("No" at step ST2), the numerical control device 1i advances the processing to step ST3.

At step ST3, the numerical control device 1i moves the Z1 shaft in the −Z direction of the Z1 shaft by the tool length difference $\Delta T$ by a rapid traverse (G00). Thereafter, the numerical control device 1i controls the Z2 shaft such that the tools T1 and T2 move respectively to the machining start positions.

At step ST4, the numerical control device 1i moves the Z1 shaft in the +Z direction of the Z1 shaft by the tool length difference $\Delta T$ by a rapid traverse (G00). Thereafter, the numerical control device 1i controls the Z2 shaft such that the tools T1 and T2 move respectively to the machining start positions.

At step ST5, the numerical control device 1i calculates, according to the associated-synchronous-tapping command, the machining hole depth D2 of the spindle on the reference side (the S2 shaft) and the machining hole depth D1 of the spindle on the associated side (the S1 shaft) and calculates the hole depth difference $\Delta D = D1 - D2$. The numerical control device 1i determines whether the hole depth difference $\Delta D$ is approximately zero (i.e., whether the absolute value of the hole depth difference ΔD is smaller than a threshold"). When the hole depth difference ΔD is approximately zero ("Yes" at step ST5), the numerical control device 1i advances the processing to step ST9. When the hole depth difference ΔD is not approximately zero ("No" at step ST5), the numerical control device 1i advances the processing to step ST6.

At step ST6, the numerical control device 1i determines whether the hole depth difference ΔD is smaller than zero (i.e., the absolute value is equal to or larger than the threshold and the hole depth difference ΔD is a negative value). When the hole depth difference ΔD is smaller than zero ("Yes" at step ST6), the numerical control device 1i advances the processing to step ST8. When the hole depth difference ΔD is equal to or larger than zero ("No" at step ST6), the numerical control device 1i advances the processing to step ST7.

At step ST7, the numerical control device 1i controls the Z2 shaft such that the tools T1 and T2 move respectively to the machining start positions and causes the tools T1 and T2 to perform cutting. At this point, the numerical control device 1i moves the Z1 shaft in the +Z direction of the Z1 shaft by the hole depth difference ΔD in parallel with the control of the Z2 shaft. The numerical control device 1i controls the feed speed v2 of the spindle on the reference side and the feed speed v1 of the spindle on the associated side according to Formula 5 and controls the rotating speed N2 of the spindle on the reference side and the rotating speed N1 of the spindle on the associated side according to Formula 7.

At step ST8, the numerical control device 1i controls the Z2 shaft such that the tools T1 and T2 move respectively to the machining start positions and causes the tools T1 and T2 to perform cutting. At this point, the numerical control device 1i moves the Z1 shaft in the −Z direction of the Z1 shaft by the hole depth difference ΔD in parallel with the control of the Z2 shaft. The numerical control device 1i controls the feed speed v2 of the spindle on the reference side and the feed speed v1 of the spindle on the associated side according to Formula 5 and controls the rotating speed N2 of the spindle on the reference side and the rotating speed N1 of the spindle on the associated side according to Formula 7.

At step ST9, the numerical control device 1i controls the Z2 shaft while maintaining the Z1 shaft in a fixed state such that the tools T1 and T2 move respectively to the machining start positions and causes the tools T1 and T2 to perform cutting. At this point, the numerical control device 1i controls, for example, the rotating speed N2 of the spindle on the reference side and the rotating speed N1 of the spindle on the associated side such that they are equal to each other.

As explained above, in the embodiment, in the numerical control device 1i, the control operation unit 50i associates, according to the associated-synchronous-tapping command, the rotation and the feed of the spindle on the reference side (the S2 side) of the spindles with the rotation and the feed of the spindle on the associated side (the S1 shaft) and simultaneously performs the synchronous tapping with the tools T1 and T2. Consequently, it is possible to simultaneously accurately perform the synchronous tapping with the tools T1 and T2 while taking into account the difference in the machining conditions between the spindles (the S1 shaft and the S2 shaft). That is, when the machining conditions are different for each spindle, it is possible to improve accuracy in the simultaneous performance of synchronous tapping with a plurality of tools and implement cycle time improvement through a reduction in the planning time.

In the embodiment, in the numerical control device 1i, the control operation unit 50i associates, for example, according to the associated-synchronous-tapping command, the rotation and the feed of the spindle on the associated side with the rotation and the feed of the spindle on the reference side such that the difference between the rotating speed of the spindle on the reference side (the S2 shaft) and the rotating speed of the spindle on the associated side (the S1 shaft) with respect to the same feed corresponds to the different pitches of the screw grooves that should be machined, and simultaneously performs the synchronous tapping at the different pitches with the tools T1 and T2. Consequently, it is possible to simultaneously perform the synchronous tapping with a plurality of tools at the different pitches while taking into account the difference in machining conditions between the spindles. Therefore, it is possible to increase variations of machining.

In the embodiment, in the numerical control device 1i, the control operation unit 50i associates, for example, according to the associated-synchronous-tapping command, the rotation and the feed of the spindle on the associated side with the rotation and the feed of the spindle on the reference side such that the difference between the distance between the tool T2 of the spindle on the reference side (the S2 shaft) and the workpiece W2 and the distance between the tool T1 of the spindle on the associated side (the S1 shaft) and the workpiece W1 corresponds to the difference between the tool length of the spindle on the reference side (the S2 shaft) and the tool length of the spindle on the associated side (the S1 shaft), and simultaneously performs the synchronous tapping with the tools T1 and T2. It is possible to simultaneously perform synchronous tapping by associating the spindles, for example, after changing the distance between the spindle (the S1 shaft), which is part of the spindles, and the workpiece W1 opposed to the spindle (the S1 shaft) such that the spindles substantially simultaneously reach the surfaces of workpieces when the spindles are fed by the Z2 shaft. Consequently, when the tool length of the tool is different for each spindle, it is possible to simultaneously accurately perform the synchronous tapping on the workpieces W1 and W2 with the tools T1 and T2. Therefore, it is possible to increase variations of machining.

In the embodiment, in the numerical control device 1i, the control operation unit 50i associates, for example, according to the associated-synchronous-tapping command, the rotation and the feed of the spindle on the associated side with the rotation and the feed of the spindle on the reference side such that the difference between the distance between the tool T2 of the spindle on the reference side (the S2 shaft) and the workpiece W2 and the distance between the tool T1 of the spindle on the associated side (the S1 shaft) and the workpiece W1 corresponds to the difference between the machining hole depth D2 of the spindle on the reference side (the S2 shaft) and the machining hole depth D1 of the spindle on the associated side (the S1 shaft), and simultaneously performs the synchronous tapping with the tools T1 and T2. It is possible to simultaneously perform synchronous tapping by associating the spindles, for example, while changing the distance between the spindle (the S1 shaft), which is part of the spindles, and the workpiece W1 opposed to the spindle (the S1 shaft) such that the machining hole depths of the spindles are equal when the spindles are fed by the Z2 shaft. Consequently, when the machining hole depth that should be machined is different for each spindle, it is possible to simultaneously accurately perform the synchronous tapping on the workpieces W1 and W2 with the tools T1 and T2. Therefore, it is possible to increase variations of machining.

Note that, in the example explained in the embodiment, one spindle on the associated side is associated with the spindle on the reference side. However, a plurality of spindles on the associated side can be associated with the spindle on the reference side. For example, in the associated-synchronous-tapping command shown in FIG. 3 and FIG. 6, the description "S3=S1=S2" can be used instead of the description "S1=S2". In this case as well, an analysis reveals that the spindle (the S2 shaft) on the rightmost side in the description "S3=S1=S2" is the spindle on the reference side and the other shafts (the S3 shaft and the S1 shaft) are the spindles on the associated side.

Figure 12:
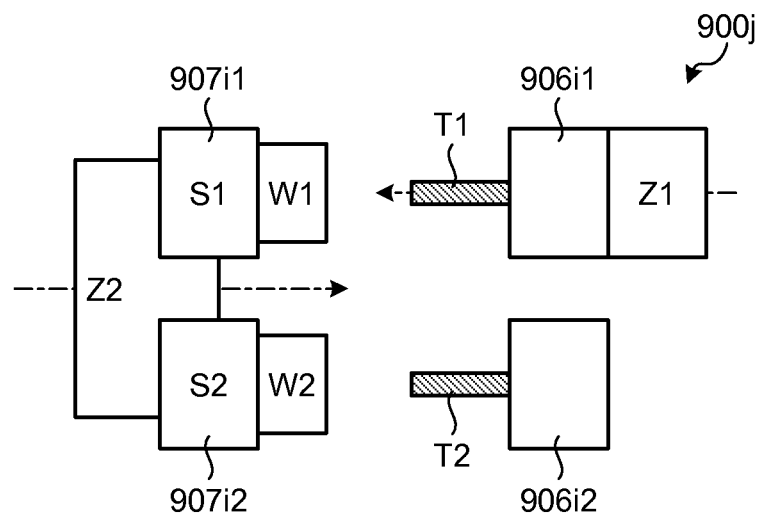
FIG. 12 is a diagram showing the configuration of a machine tool in a modification of the embodiment.

Alternatively, the configuration of a machine tool 900j can be a configuration shown in FIG. 12. In the machine tool 900j, the two workpiece supporting units 907i1 and 907i2 are provided on the Z2 shaft side. The two tool posts 906i1 and 906i2 are provided on the Z1 shaft side. The tool post 906i2 is fixed. In the machine tool 900j, the Z2 shaft (the feed shaft) feeds the workpieces W1 and W2 in a direction in which the workpieces W1 and W2 approach the tools T1 and T2. The Z1 shaft (the second feed shaft) feeds one tool T1 in a direction in which the one tool T1 approaches the workpiece W1 opposed to the one tool T1. In this case as well, it is possible to control the spindles (the S1 shaft and the S2 shaft), the Z1 shaft, and the Z2 shaft and perform control that is the same as the control in the embodiment.

Figure 13:
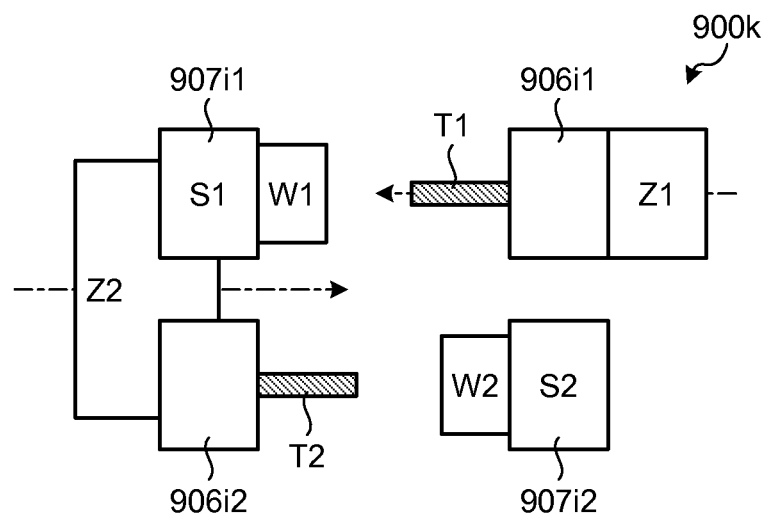
FIG. 13 is a diagram showing the configuration of a machine tool in another modification of the embodiment.

Alternatively, the configuration of a machine tool 900k can be a configuration shown in FIG. 13. In the machine tool 900k, the workpiece supporting unit 907i1 and the tool post 906i2 are provided on the Z2 shaft side and the tool post 906i1 and the workpiece supporting unit 907i2 are provided on the Z1 shaft side. The tool post 906i2 is fixed. In the machine tool 900k, the Z2 shaft (the feed shaft) feeds the workpiece W1, which is part of the workpieces W1 and W2, in a direction in which the workpiece W1 approaches the tool T1 and feeds the remaining tool T2 excluding the tool T1 in the tools T1 and T2 in a direction in which the tool T2 approaches the workpiece W2 opposed to the remaining tool T2. The Z1 shaft (the second feed shaft) feeds one tool T1 in a direction in which the one tool T1 approaches the workpiece W1 opposed to the one tool T1. In this case as well, it is possible to control the spindles (the S1 shaft and the S2 shaft), the Z1 shaft, and the Z2 shaft and perform control that is the same as the control in the embodiment.

Figure 14:
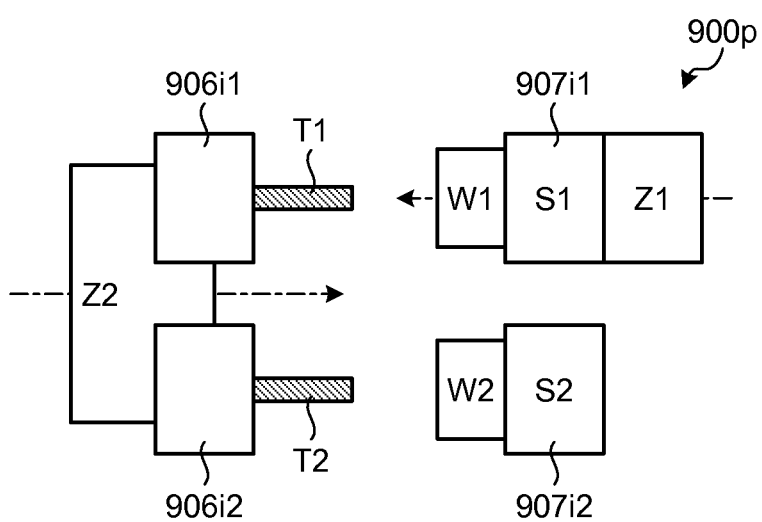
FIG. 14 is a diagram showing the configuration of a machine tool in another modification of the embodiment.

Alternatively, the configuration of a machine tool 900p can be a configuration shown in FIG. 14. In the machine tool 900p, the two tool posts 906i1 and 906i2 are provided on the Z2 shaft side and the two workpiece supporting units 907i1 and 907i2 are provided on the Z1 shaft side. The workpiece supporting unit 907i2 is fixed. In the machine tool 900p, the Z2 shaft (the feed shaft) feeds the tools T1 and T2 in a direction in which the tools T1 and T2 approach the workpieces W1 and W2. The Z1 shaft (the second feed shaft) feeds the workpiece W1 opposed to one tool T1 in a direction in which the workpiece W1 approaches the one tool T1. In this case as well, it is possible to control the spindles (the S1 shaft and the S2 shaft), the Z1 shaft, and the Z2 shaft and perform control that is the same as the control in the embodiment.

INDUSTRIAL APPLICABILITY

As explained above, the numerical control device according to the present invention is useful for the synchronous tapping.

REFERENCE SIGNS LIST 1, 1i numerical control device, 50, 50i control operation unit.

The invention claimed is:

1. A numerical control device that controls a machine tool including a plurality of spindles that each rotate a tool opposed to a workpiece around a tool axis relative to the workpiece, a first feed shaft that performs a feed operation such that a plurality of the tools relatively move closer to a plurality of the workpieces, and a second feed shaft that changes a distance between one tool among the tools and a workpiece opposed to the one tool, the numerical control device comprising an associated-synchronous-tapping unit to, according to an associated-synchronous-tapping command, associate, by using the first feed shaft, rotation and feed of a spindle on an associated side among the spindles with rotation and feed of a spindle on a reference side among the spindles and associate, by using the second feed shaft, the rotation and feed of the spindle on the associated side with the rotation and feed of the spindle on the reference side such that a difference between a distance between a tool of the spindle on the reference side and a workpiece and a distance between a tool of the spindle on the associated side and a workpiece corresponds to a difference between a tool length of the spindle on the reference side and a tool length of the spindle on the associated side, and simultaneously perform, with the tools, synchronous tapping in which the one tool and a tool other than the one tool among the tools have different machining conditions.

2. The numerical control device according to claim 1, wherein the associated-synchronous-tapping unit associates, according to the associated-synchronous-tapping command, the rotation and feed of the spindle on the associated side with the rotation and feed of the spindle on the reference side such that a rotating direction of the spindle on the reference side and a rotating direction of the spindle on the associated side are opposite to each other and simultaneously performs reverse tapping with the tools.

3. The numerical control device according to claim 1, wherein the associated-synchronous-tapping unit associates, according to the associated-synchronous-tapping command, the rotation and feed of the spindle on the associated side with the rotation and feed of the spindle on the reference side such that a difference between a rotating speed of the spindle on the reference side and a rotating speed of the spindle on the associated side with respect to a same feed corresponds to different pitches and simultaneously performs synchronous tapping with the tools at the different pitches.

4. The numerical control device according to claim 3, wherein the associated-synchronous-tapping unit associates, according to the associated-synchronous-tapping command, the rotation and feed of the spindle on the associated side with the rotation and feed of the spindle on the reference side such that a rotating direction of the spindle on the reference side and a rotating direction of the spindle on the associated side are opposite to each other and simultaneously performs reverse tapping with the tools.

5. The numerical control device according to claim 1, wherein
the first feed shaft feeds the workpieces in a direction in which the workpieces approach the tools, and
the second feed shaft feeds the one tool in a direction in which the one tool approaches a workpiece opposed to the one tool.

6. A numerical control device that controls a machine tool including a plurality of spindles that each rotate a tool opposed to a workpiece around a tool axis relative to the workpiece, a first feed shaft that performs a feed operation such that a plurality of the tools relatively move closer to a plurality of the workpieces, and a second feed shaft that changes a distance between one tool among the tools and a workpiece opposed to the one tool, the numerical control device comprising
an associated-synchronous-tapping unit to, according to an associated-synchronous-tapping command, associate, by using the first feed shaft, rotation and feed of a spindle on an associated side among the spindles with rotation and feed of a spindle on a reference side among the spindles and associate, by using the second feed shaft, the rotation and feed of the spindle on the associated side with the rotation and feed of the spindle on the reference side such that a difference between a distance between a tool of the spindle on the reference side and a workpiece and a distance between a tool of the spindle on the associated side and a workpiece corresponds to a difference between a machining hole depth of the spindle on the reference side and a machining hole depth of the spindle on the associated side, and simultaneously perform, with the tools, synchronous tapping in which the one tool and a tool other than the one tool among the tools have different machining conditions.

7. The numerical control device according to claim 6, wherein the associated-synchronous-tapping unit associates, according to the associated-synchronous-tapping command, the rotation and feed of the spindle on the associated side with the rotation and feed of the spindle on the reference side such that a rotating direction of the spindle on the reference side and a rotating direction of the spindle on the associated side are opposite to each other and simultaneously performs reverse tapping with the tools.

8. The numerical control device according to claim 6, wherein the associated-synchronous-tapping unit associates, according to the associated-synchronous-tapping command, the rotation and feed of the spindle on the associated side with the rotation and feed of the spindle on the reference side such that a difference between a rotating speed of the spindle on the reference side and a rotating speed of the spindle on the associated side with respect to a same feed corresponds to different pitches and simultaneously performs synchronous tapping with the tools at the different pitches.

9. The numerical control device according to claim 8, wherein the associated-synchronous-tapping unit associates, according to the associated-synchronous-tapping command, the rotation and feed of the spindle on the associated side with the rotation and feed of the spindle on the reference side such that a rotating direction of the spindle on the reference side and a rotating direction of the spindle on the associated side are opposite to each other and simultaneously performs reverse tapping with the tools.

10. The numerical control device according to claim 6, wherein
the first feed shaft feeds the workpieces in a direction in which the workpieces approach the tools, and
the second feed shaft feeds the one tool in a direction in which the one tool approaches a workpiece opposed to the one tool.

* * * * *